United States Patent [19]

Nakai et al.

[11] Patent Number: 4,509,846
[45] Date of Patent: Apr. 9, 1985

[54] CAMERA SYSTEM

[75] Inventors: Masaaki Nakai, Nara; Masayoshi Sahara, Sennan; Nobuyuki Taniguchi, Tondabayashi, all of Japan

[73] Assignee: Minolta Camera Kabushiki Kaisha, Osaka, Japan

[21] Appl. No.: 487,206

[22] Filed: Apr. 21, 1983

[51] Int. Cl.³ ............... G03B 7/091; G03B 7/26; G03B 17/00

[52] U.S. Cl. .................. 354/442; 354/484; 354/286; 354/289.12

[58] Field of Search ............ 354/410, 412, 441, 442, 354/445, 448, 484, 286, 289.1, 289.11, 289.12, 295, 62, 273, 455; 364/525, 526

[56] References Cited

U.S. PATENT DOCUMENTS

| 3,879,137 | 4/1975 | Sakazaki et al. | 356/218 |
| 4,089,011 | 5/1978 | Date et al. | 354/445 |
| 4,092,656 | 5/1978 | Lang et al. | 354/286 X |
| 4,118,726 | 10/1978 | Kuramoto et al. | 354/286 X |
| 4,304,472 | 12/1981 | Shinoda et al. | 354/289.12 X |
| 4,343,300 | 8/1982 | Hattori | 354/62 X |
| 4,387,977 | 6/1983 | Uchidoi et al. | 354/484 |
| 4,391,488 | 7/1983 | Ishizaka et al. | 354/286 X |

FOREIGN PATENT DOCUMENTS

| 53-50420 | 12/1978 | Japan . |
| 108628 | 8/1979 | Japan . |
| 56-29220 | 3/1981 | Japan . |

Primary Examiner—William B. Perkey
Attorney, Agent, or Firm—Jackson, Jones & Price

[57] ABSTRACT

A camera system includes a data source provided in a camera accessory such as an interchangeable lens and a micro-computer in a camera body. A requesting data for requesting particular data related to the lens is sent from the camera body to the lens, whereby the lens produces the particular data and sends it to the camera body. By the use of the particular data from the lens and other data obtained from the camera body, the micro-computer carries out exposure calculations and controls the camera based on the calculated result.

51 Claims, 19 Drawing Figures

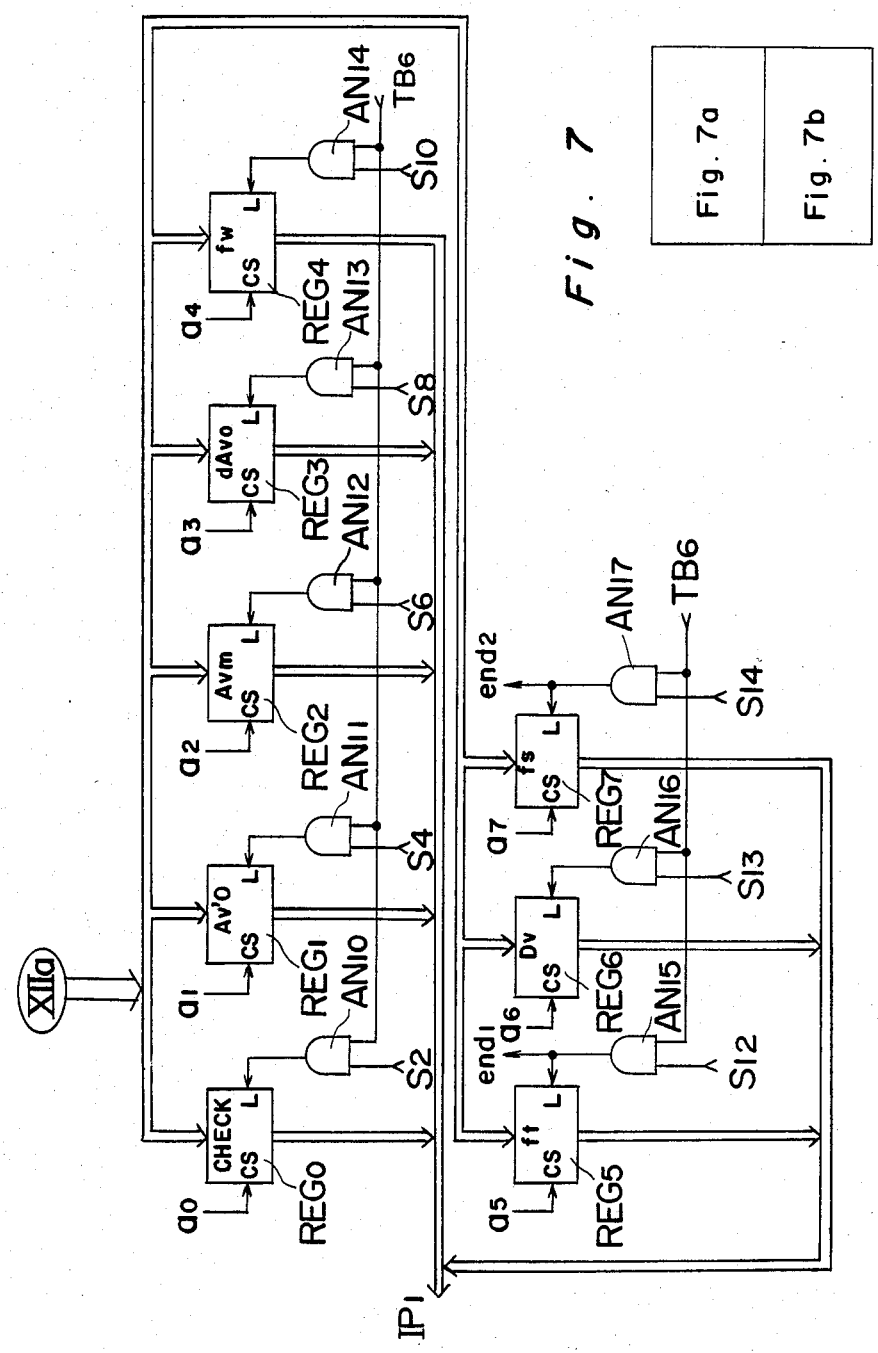

CAMERA SYSTEM

BACKGROUND OF THE INVENTION

1. Field of the Invention

The present invention relates to a camera system operable by means of a cooperation between a camera body and a camera accessory, such as an interchangeable lens or lens converter, to be mounted on the camera body. It also relates to an improvement of a camera body itself and a camera accessory itself to be employed in the camera system.

2. Description of the Prior Art

According to the prior art camera system operable by means of a cooperation between a camera body and a camera accessory, the camera accessory, such as an interchangeable lens, has an information carrying circuit, such as a ROM (read-only-memory), wherein various fixed data, for example, maximum and minimum aperture size of the interchangeable lens, is previously stored at various addresses. When a particular address is specified, data stored therein is read out and sent to the camera body.

However, the prior art camera systems have various problems when designing the camera system for the practical use. One problem is the mechanical connection between the camera body and camera accessory. Since the camera accessories are vary often mounted on and dismounted from the camera body, there exists a chance of an incompleted connection which fails in realizing an expected cooperation therebetween. For example, the setting of aperture size by means of rotating the aperture setting ring of the interchangeable lens would not be correctly transmitted to the camera body if the rotational mounting of the interchangeable lens on the camera body is incomplete and the rotational relation therebetween is incorrect.

Another problem, which relates to the above problem, is the electric connection between the camera body and camera accessory. To exchange the information between the camera body and camera accessory, a plurality of terminals are necessary both on the camera body and on the camera accessory, but the number of the terminals should be as small as possible to avoid the possibility of any misconnection. According to the prior art, however, a consideration of such a problem relating to a practical product has been insufficient.

A further problem is how to deal with a signal representing a variant data, such as an aperture size data, to be set in the camera accessory and to be transmitted to the camera body. Some contrivances are necessary both in the camera accessory side and the camera body side to have the camera body side accurately respond to every change in the variant data on the camera accessory side.

On the other hand, a prior art camera system has been known which includes: an electric resistive plate provided in a camera body; and a movable contact member provided in the camera body, which movable contact member is slidable along the resistive plate and moves relative to the rotation of an aperture control ring provided on the lens; whereby by changing the resistance value as the shift of the contact member on the resistive plate, a signal relative to the set aperture size is obtained. According to the above prior art arrangement, the resistivity of the resistive plate varies between the manufactured pieces, and also after having been used overtime. Thus, its reliability is very poor. Furthermore, in the case where the calculation is carried out in digital form, it is necessary to change the obtained signal into digital form and, for this purpose, the prior art arrangement further requires an A-D (analog-to-digital) converter, which not only increases the constucting components, but also requires an A-D conversion time which delays the shutter release operation; one may miss a shutter chance.

To solve to above problem of the arrangement for producing a signal representing a variant data, one may think of replacing the resistive plate with a coded pattern which directly produces a digital signal as the contact member slides along the coded pattern. Since this arrangement, however, obtains the digital signal that changes discretely directly from the coded pattern, the coded pattern becomes rather large in area and complicated in pattern layout to obtain an electric signal with a high preciseness. Therefore, the increase of area of the coded pattern results in bulky size of a camera; and the complicated pattern layout results in difficult manufacturing of the coded pattern and may easily produce an erroneous signal by a small shock to the device or by a slight displacement of the contact member.

In addition to the above, the prior art arrangement for producing a signal representing a variant data, such as an aperture data, has a following disadvantage particularly when obtaining a signal representing an amount of stop-down, i.e., a difference between the maximum aperture size and set aperture size, from the arrangement.

Generally, the signal representing an amount of stop-down can be obtained by the steps of obtaining maximum aperture size and set aperture size, and subtracting the set aperture size from the maximum aperture size. Or, it can be obtained by the steps of obtaining an amount of shift effected to the aperture setting element for the aperture change from the maximum to set aperture size, and converting the shifted amount to stop-down amount.

According to the former method, it is necessary to provide a set of coded pattern and movable contact member both for obtaining the maximum aperture size and for obtaining the set aperture size. In addition, the former method further requires a subtractor. This results in an increase of constructing parts and bulky size.

According to the latter method, since the aperture size is generally given by a multiple of ½ Av (Av represents an aperture size under APEX numbering system and, here "½ Av" means "½ in Av value"), the set aperture size is calculated using the signal representing the maximum aperture size and the signal representing the shifted amount which is equal to the multiple of ½ Av. When the mounted lens is a standard type having a maximum aperture size equal to a standard F-stop value, such as F1.4, F1.7, F2, F2.8, F3.4, F4, or the like having a value equal to the multiple of ½ Av, the set aperture size as calculated also has a value equal to the multiple of ½ Av, i.e., equal to the standard F-stop value. A problem arises when the mounted lens is a non-standard type having a maximum aperture size other than standard F-stop values, such as F1.8, F2.5, F3.5 or the like. When such a non-standard type lens is mounted, the calculated set aperture size is not equal to the multiple of ½ Av, but includes an error less than ½ Av. To reduce such an error, it is necessary to give the aperture value by a multiple of a smaller fraction of 1 Av, e.g., the error would be less than ¼ Av if the set aperture value is given by a multiple of ¼ Av. This can be practiced by means of subdividing the patterns on the digital code plate, which however increases the size of the digital code plate and the number of patterns on it. This problem also arises in the former method.

SUMMARY OF THE INVENTION

The present invention has been developed with a view to substantially solving the above described problems and has for its essential object to provide an improved camera system which can cope with an incomplete mounting of a camera accessory on the camera body.

It is also an essential object of the present invention to provide a camera body for use in the above described camera system, capable of responding to every change in variable data set in the mounted camera accessory.

It is another essential object of the present invention to provide a camera accessory for use in the above described camera system, which can send previously stored fixed data and variable data as varied by a manual operation to the camera body.

It is a further object of the present invention to provide an improved set of camera body and camera accessory for use in the above described camera system, which has a minimized number of necessary interconnection terminals.

It is yet another object of the present invention to provide an improved set of camera body and camera accessory for use in the above described camera system having a contact member movable along a coded pattern in the camera body, an aperture setting member in the camera accessory for moving the contact member, and means for producing a digital signal in the camera body relative to the position of the contact member on the coded pattern.

In accomplishing these and other objects, the present invention is characterized in that a means for detecting whether the camera accessory is properly mounted on the camera body or not is provided, and that the detected signal controls the mode of exposure calculation.

The present invention is also characterized in that the signal reading in the camera accessory and signal transmission from the camera accessory to the camera body are carried out repeatedly for a period of time while a manually operable means is operated manually, and that the same are also carried out repeatedly for a predetermined number of cycles even after the release of the manually operable means, thereby renewing the data in the camera body caused by any change of set data in the camera accessory during both periods.

The present invention is further characterized in that the start of power supply from the camera body to the camera accessory also represents a signal that starts data reading in the camera accessory, whereby a terminal for the power supply can also be utilized for starting the data reading operation, thus reducing the number of terminals.

The present invention is still further characterized in that address data from the camera body and address data based on manual setting in the camera accessory can be selected to designate an address in the ROM in camera accessory.

The present invention is also characterized in that the stop-down signal obtained from a coded pattern and a movable contact member is in digital form which changes discretely with a rate of ½ Av.

The present invention, in relation to the above feature, is further characterized in that information relating to an approximate maximum aperture size rounded to ½ Av unit and to the true maximum aperture size are transmitted from the camera accessory to the camera body.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIGS. 7a and 7b taken together as shown in FIG. 7 show an exemplified circuit diagram of an interface circuit IF shown in FIG. 1;

DESCRIPTION OF THE PREFERRED EMBODIMENT

Figure 1:
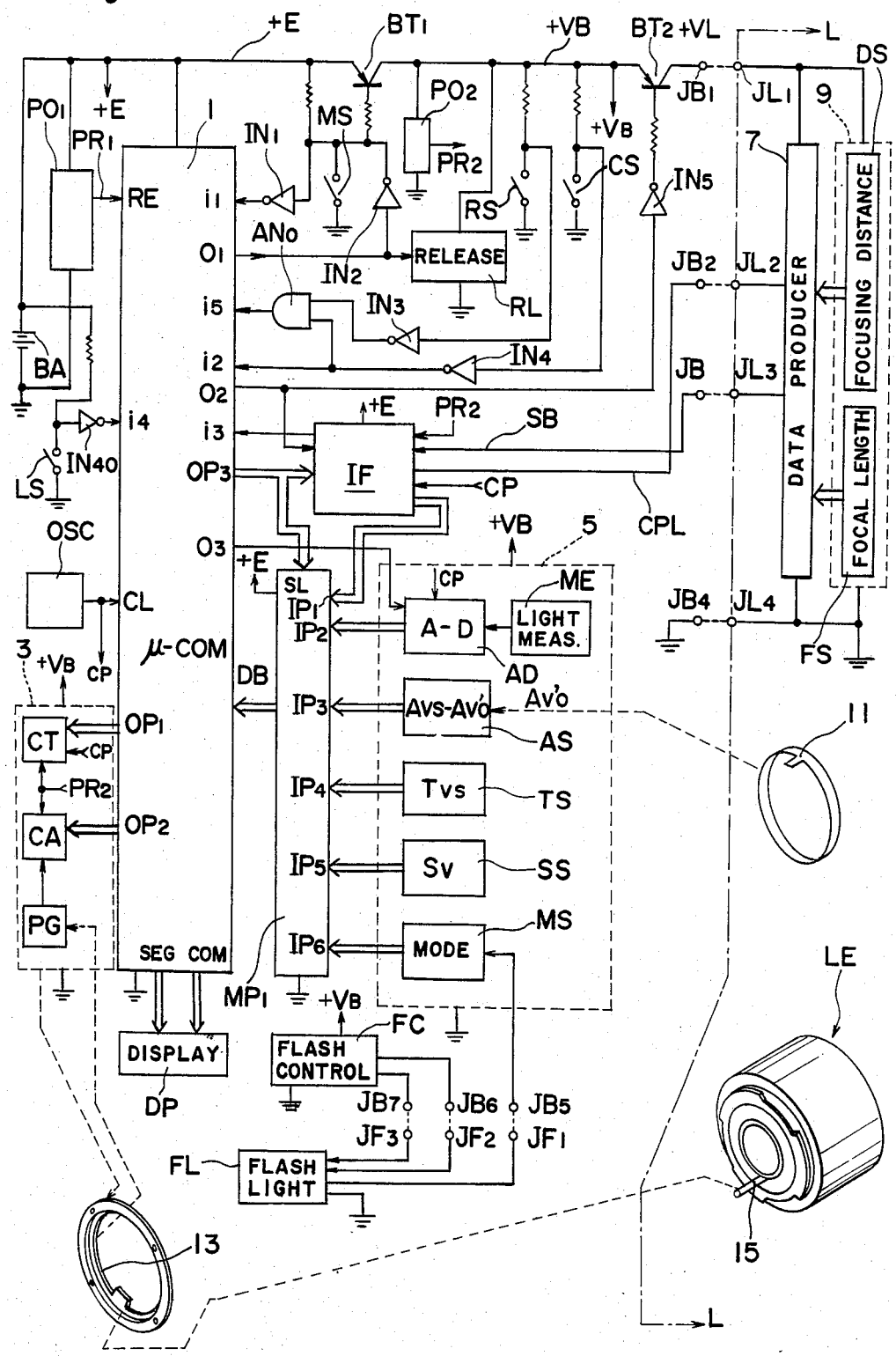
FIG. 1 is a block diagram of a camera system according to a preferred embodiment of the present invention.

Referring to FIG. 1, a camera system according to the present invention comprises a first portion to be employed in a camera body (not shown) and a second portion to be employed in a camera accessory, which is mountable on the camera body. The first portion is shown on the left-hand side of a line L—L shown in FIG. 1 and the second portion is shown on the right-hand side thereof. In the preferred embodiment of the present invention described below, an interchangeable lens is employed for the camera accessory, but it can be any other accessory, such as a bellows, a reverse adaptor, a teleconverter, an extension ring, a strobo for emitting a flash-light, a motor drive device, or a data back device. In the circuit diagram of FIG. 1, and also in FIGS. 7a, 7b and 11, a broad line indicates a bundle of wires for transmitting a signal comprising a plurality of bits.

In FIG. 1, a reference number 1 designates a micro-computer or a micro-processor which sequentially controls the thorough operation of the camera system and also calculates to provide exposure information. When a battery BA is loaded in the camera, a power-on-reset circuit PO1 produces a power-on-reset signal PR1 which is applied to to reset terminal RE of the micro-computer 1. Accordingly, the micro-computer 1 is turned to a reset condition. An oscillator OSC is provided for producing a reference clock pulses CP which are applied to a clock terminal CL of the micro-computer 1 and also to other circuits for synchronizing the entire operation of the camera system shown in FIG. 1. A display device DP is formed, for example, by a liquid crystal and is operated in a time divided manner by signals obtained from segment terminal SEG and common terminal COM of the micro-computer 1 for the display of exposure control value, exposure control mode, warning indication, and so on. The micro-computer 1, the oscillator OSC and the display device DP, as well as other circuits, such as interface circuit IF, data selector MP1, inverters IN1 to IN5 and IN40, and AND gate AN0, receive electric power directly from the battery BA through a power line +E.

A normally open switch MS is a light measuring switch that closes when carrying out the light measuring operation. When the light measuring switch MS closes, an inverter IN1 produces a "HIGH" which is applied to an input i1 of the micro-computer 1. In response to the "HIGH" to the input i1, the micro-computer 1 reads data necessary for the exposure control and, at the same time, starts A-D (analog to digital) conversion of the signal from the light measuring circuit, exposure calculation and display operation. Furthermore, when the light measuring switch MS closes, a transistor BT1 conducts to provide electric power to a power line +VB, thus permitting the electric power supply to circuits in the camera body other than those which have been already receiving power from the power line +E. Moreover, when the transistor BT1 conducts, a power-on-reset PO2 produces a reset signal PR2, which is applied to each of exposure time control device CT and aperture control device CA, described later, for resetting them.

A circuit 3 enclosed by a broken line is an exposure control portion comprising exposure time control device CT, aperture control device CA, and pulse generator PG. The exposure time control device CT receives a fixed, or calculated, exposure time data Tv. Tv represents a value of time given in APEX numbering system. Similarly, other reference characters with a suffix of v, such as Av, Avo, Bv, Sv, Ev, represent values in APEX numbering system. Tv is received from an output terminal OP1 of the micro-computer 1 and the timing control device CT establishes a period of time relative to the data Tv (i.e., a period of time $2^{-Tv}$ from open-operation to close-operation of a shutter mechanism) using clock pulses CP so as to control the exposure time. The aperture control device CA receives a fixed, or calculated, stop-down degree data Av−Av'o (a detail of this data will be described later) from an output terminal OP2 of the micro-computer 1, and also pulses from the pulse generator PG. The pulse generator PG is provided operatively in association with a ring 13, which rotates together with a pin 15 in the interchangeable lens LE, and produces a number of pulses corresponding to the degree of rotation of the ring 13. More particularly, the interchangeable lens LE has a pin 15 connected to a diaphragm for the simultaneous movement about the axis of the lens LE with respect to the change of aperture size of the diaphragm, and is also connected to a first spring (not shown) for urging the diaphragm to fully open the aperture. On the other hand, the ring 13 has a projection which is held in contact with the pin 15 by an urging force of a second spring (not shown) connected to ring 13. The ring 13 further has a rack (not shown) which is engageable to a pawl (not shown). Since the second spring connected to the ring 13 is stronger than the first spring connected to the pin 15, the ring 13 starts to rotate by the force of the second spring when the pawl disengages from the rack, and, at the same time, the rotation of the ring 13 is transmitted to the pin 15 causing reduction of the aperture size of the diaphragm. During the rotation of the ring 13, the aperture control device CA counts the number of pulses from the pulse generator PG; the number of pulses corresponds to the degree of reduction of aperture size of the lens LE. The counted number is compared with the stop-down degree data Av−Av'o from the output OP1 of the micro-computer 1, and when these two match with each other, the pawl is so actuated as to stop the rotation of the ring 13, thus setting the diaphragm to a controlled aperture size.

A switch LS is a normally open switch provided for detecting whether the interchangeable lens LE is properly mounted on the camera or not. The switch LS closes when the interchangeable lens LE is mounted and locked to a camera mount, but it is maintained open when the locking is incomplete. When the switch LS closes, an inverter IN40 produces a "HIGH" which is applied to the micro-computer 1 through an input i4. In response to this, the micro-computer 1 starts to read data from the mounted lens LE and carries out an exposure calculation. On the contrary, when the switch LS is maintained open to provide a "LOW" to the input i4, the micro-computer reads no data from the lens, but carries out other calculations as will be described later. Next, a manner of installing the switch LS is described.

Figure 2:
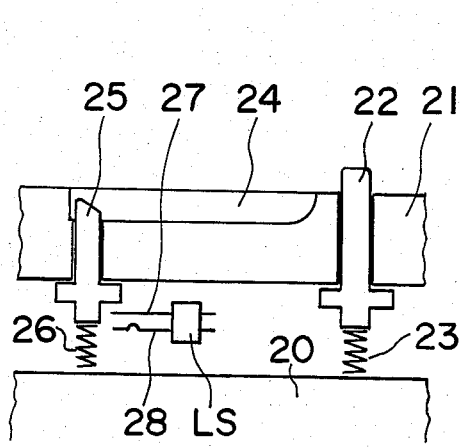
FIGS. 2 and 3 are fragmentary views each showing a switch arrangement in association with a mount for receiving a camera accessory, FIG. 2 particularly showing a condition with no camera accessory, and FIG. 3 particularly showing a condition with a camera accessory properly mounted on the camera body.
Figure 3:
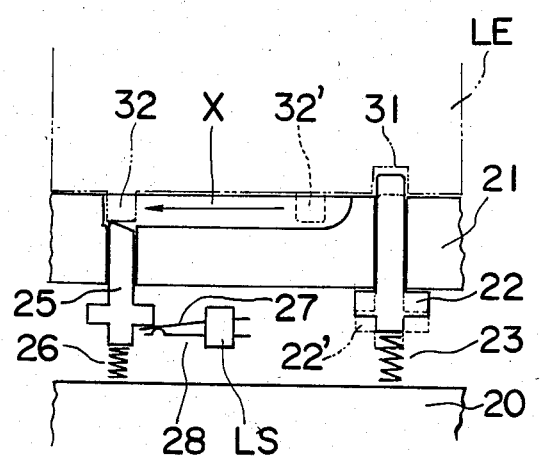

Referring to FIGS. 2 and 3, 20 is a camera body, 21 is a mount for receiving lens, and 22 is a lock pin which is normally projecting outwardly from the mount 21 by a spring 23. The mount 21 is formed with a groove 24 for receiving and guiding a pin 32 extending from an interchangeable lens. A pin 25 normally intruding into the groove 24 by a pushing force of a spring 26 is provided at one end of the groove 24. The pin 25 is provided operatively in association with the switch LS having a pair of leads 27 and 28 such that, when the pin 25 is positioned to have its one end intruding into the groove 24, as shown in FIG. 2, the leads 27 and 28 are held apart from each other, maintaining the switching LS in the open condition. But when the pin 25 is pushed downwardly, as shown in FIG. 3, the leads 27 and 28 contact each other to place the switch LS in the closed condition.

As shown in FIG. 3 by a chain line, a bayonet type interchangeable lens LE has a projection 32 which slides along the groove 24, and a recess 31 for receiving the lock pin 22. When the bayonet type interchangeable lens LE seats on the mount 21 with the projection 32 being located at 32' as accomplished by matching the markings on the lens and the body, the recess 31 is in offset relation to the lock pin 22. Thus, the lock pin 22 is held downwardly in a position 22' as shown by a broken line in FIG. 3. At this condition, the pin 25 is held in the position shown in FIG. 2. Then, by turning the lens to shift the projection 32 along the groove 24 in a direction indicated by an arrow X, the projection 32 contacts the pin 25 and, accordingly, the pin 25 is pushed downwardly, as shown in FIG. 3, turning the switch LS to the closed condition by the contact between the leads 27 and 28. At this moment, the the recess 31 is so positioned as to receive the lock pin 22, thus preventing the lens from being rotated in any direction and thereby establishing a rigid contact between the camera body and the lens. To remove the lens, a suitable release lever or pin (not shown) is provided for pushing down the lock pin 22, thereby allowing the turning of the lens. When the lens LE is rotated from the locked position, the switch LS is turned back to open condition.

Referring back to FIG. 1, a circuit portion enclosed by a broken line 5 is a provided for producing exposure control data, and it includes light measuring circuit ME, A-D (analog to digital) converter AD, set aperture size signal producing device AS, set exposure time signal producing device TS, film sensitivity signal producing device SS, and mode signal producing device MS. The light measuring circuit ME is, for example, a TTL (through-the-lens) full-open average metering type, and it produces a signal Bv—Avo in analog form representing the brightness of an object when viewed through the lens. Thus, the signal Bv—Avo is determined not only by the brightness of the object itself, but also by the aperture size of the lens. The A-D converter AD receives the signal Bv—Avo in analog form from the light measuring circuit ME, and converts it to digital form by a clock pulse CP in response to a positive going pulse from an output O3 of the microcomputer 1. The converted signal Bv—Avo in digital form is applied to a data selector MP1 at an input IP2.

The set aperture size signal producing device AS produces a data Avs—Av'o and provides it to the data selector MP1 at an input IP3. The data Avs—Av'o represents the position of an aperture setting ring 11 in the lens LE. One specific arrangement of the set aperture size signal producing device AS is described below in connection with FIG. 4.

Figure 4:
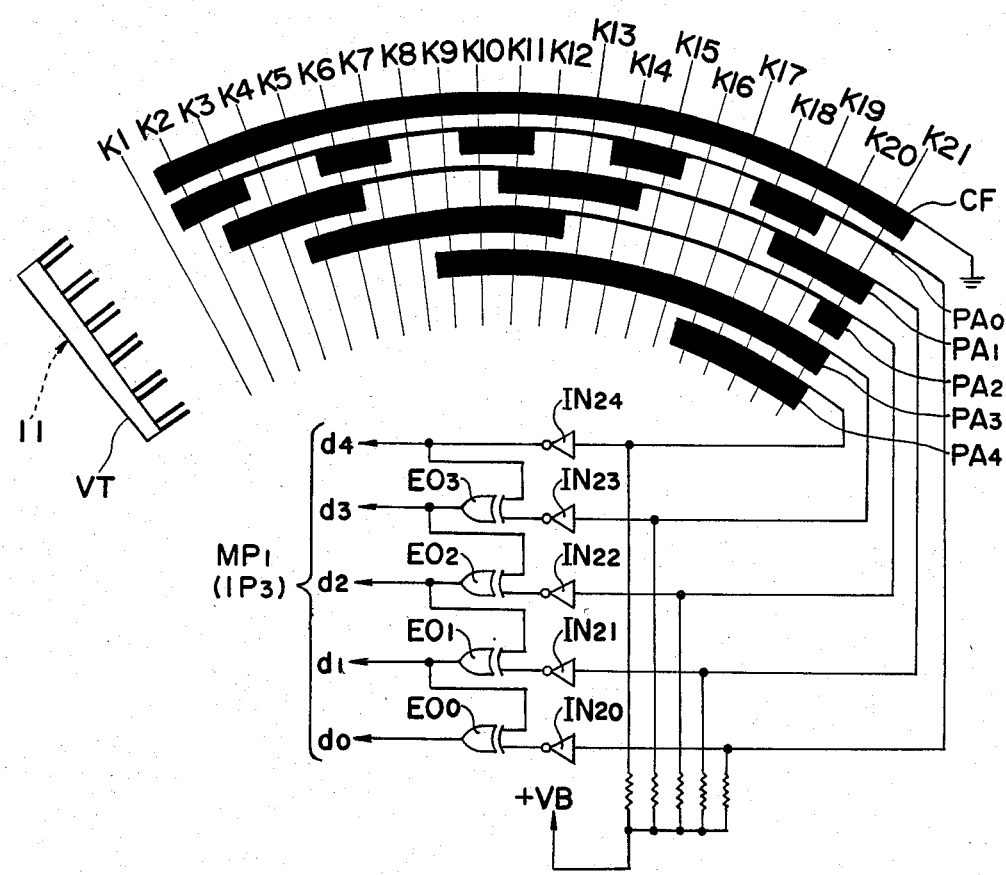
FIG. 4 is an exemplified circuit diagram of a circuit AS shown in FIG. 1.

Referring to FIG. 4, a brush VT is provided operatively in association with the ring 11 to slide along an array of electrodes CF, PA0, PA1, PA2, PA3 and PA4 disposed in a predetermined pattern. A suitable click mechanism is provided to hold the brush VT in one of a plurality of engageable positions K1 to K21. The electrode CF is connected to ground, and the electrodes PA0 to PA4 are each connected to a suitable pull-up resistor and further to the power line +VB. Furthermore, the electrodes PA0 to PA4 are connected to inverters IN20 to IN24, respectively. When the brush VT is so positioned as to connect the electrode PA0 with the ground electrode CF, the inverter IN20 produces a "HIGH". On the other hand, when the brush VT is so positioned as to disconnect the electrode PA0 from the ground electrode CF, the inverter IN20 produces a "LOW". The same can be said to the other electrodes PA1 to PA4. The output of the inverter IN24 is connected to one input of an exclusive OR gate EO3 and also a terminal d4. The output of the inverter IN23 is connected to the other input of the exclusive OR gate EO3, and the output of the exclusive OR gate EO3 is connected to a terminal d3 and also to one input of another exclusive OR gate EO2. Similarly, the output of the inverter IN22 is connected to the other input of the exclusive OR gate EO2, and the output of the exclusive OR gate EO2 is connected to a terminal d2 and also to one input of yet another exclusive OR gate EO1. Further, the output of the inverter IN21 is connected to the other input of the exclusive OR gate EO1, and the output of the exclusive OR gate EO1 is connected to a terminal d1 and also to one input of yet another exclusive OR gate EO0. And, lastly, the output of the inverter IN20 is connected to the other input of the exclusive OR gate EO0, and the output of the exclusive OR gate EO0 is connected to a terminal d0. The terminals d0 to d4 are all connected to the input IP3 of the data selector MP1 for supplying a binary coded signal. For example, when the brush VT is shifted to the position K2, only the terminal PA0 is grounded. Thus, the inverter IN20 produces a "HIGH", and the remaining inverters IN21 to IN24 produce a "LOW". In this case, the terminals d4 to d0 altogether produce a binary coded signal (00001). In this manner, the terminals d4 to d0 produce various binary coded signals with respect to different brush positions as shown in Table 1 below.

TABLE 1

| Position | IN24 | IN23 | IN22 | IN21 | IN20 | d4 | d3 | d2 | d1 | d0 | steps |
|---|---|---|---|---|---|---|---|---|---|---|---|
| K1 | 0 | 0 | 0 | 0 | 0 | 0 | 0 | 0 | 0 | 0 | 0 |
| K2 | 0 | 0 | 0 | 0 | 1 | 0 | 0 | 0 | 0 | 1 | 0.5 |
| K3 | 0 | 0 | 0 | 1 | 1 | 0 | 0 | 0 | 1 | 0 | 1.0 |
| K4 | 0 | 0 | 0 | 1 | 0 | 0 | 0 | 0 | 1 | 1 | 1.5 |
| K5 | 0 | 0 | 1 | 1 | 0 | 0 | 0 | 1 | 0 | 0 | 2.0 |
| K6 | 0 | 0 | 1 | 1 | 1 | 0 | 0 | 1 | 0 | 1 | 2.5 |
| K7 | 0 | 0 | 1 | 0 | 1 | 0 | 0 | 1 | 1 | 0 | 3.0 |
| K8 | 0 | 0 | 1 | 0 | 0 | 0 | 0 | 1 | 1 | 1 | 3.5 |
| K9 | 0 | 1 | 1 | 0 | 0 | 0 | 1 | 0 | 0 | 0 | 4.0 |
| K10 | 0 | 1 | 1 | 0 | 1 | 0 | 1 | 0 | 0 | 1 | 4.5 |
| K11 | 0 | 1 | 1 | 1 | 1 | 0 | 1 | 0 | 1 | 0 | 5.0 |
| K12 | 0 | 1 | 1 | 1 | 0 | 0 | 1 | 0 | 1 | 1 | 5.5 |
| K13 | 0 | 1 | 0 | 1 | 0 | 0 | 1 | 1 | 0 | 0 | 6.0 |
| K14 | 0 | 1 | 0 | 1 | 1 | 0 | 1 | 1 | 0 | 1 | 6.5 |
| K15 | 0 | 1 | 0 | 0 | 1 | 0 | 1 | 1 | 1 | 0 | 7.0 |
| K16 | 0 | 1 | 0 | 0 | 0 | 0 | 1 | 1 | 1 | 1 | 7.5 |
| K17 | 1 | 1 | 0 | 0 | 0 | 1 | 0 | 0 | 0 | 0 | 8.0 |
| K18 | 1 | 1 | 0 | 0 | 1 | 1 | 0 | 0 | 0 | 1 | 8.5 |
| K19 | 1 | 1 | 0 | 1 | 1 | 1 | 0 | 0 | 1 | 0 | 9.0 |
| K20 | 1 | 1 | 0 | 1 | 0 | 1 | 0 | 0 | 1 | 1 | 9.5 |
| K21 | 1 | 1 | 1 | 1 | 0 | 1 | 0 | 1 | 0 | 0 | 10.0 |

Next, a description is given to a relationship between a set aperture value and a shifted position of the brush VT. When the lens LE mounted on the camera body with the aperture setting ring 11 set to its maximum aperture size position, the brush VT is located at the position K1. In this case, the terminals d4 to d0 produces a binary coded signal "00000" indicating that the lens aperture is fully opened. And, when the aperture setting ring 11 of the lens LE mounted on the camera body is set to a position shifted by a 0.5 step under the unit of Av in the APEX system from the maximum aperture size, the brush VT is shifted to the position K2. In this case, the terminals d4 to d0 produces a binary coded signal "00001" indicating that the lens aperture has been reduced by a 0.5 step from its fully opened size. And similarly, when the aperture setting ring 11 is shifted by 1.0 step, the brush VT is shifted to the position K3. In this case, the terminals d4 to d0 produces a binary coded signal "00010" indicating that the lens aperture has been reduced by 1.0 step from its fully opened size. In the most right-hand column of Table 1, steps of reduction of aperture size under the unit of Av in APEX system are shown. When the micro-computer 1 receives the binary coded signal from the terminals d4 to d0 through the data selector MP1, the micro-computer 1 calculates the present aperture size using the data of fully opened aperture size of the mounted lens obtained from the data producer 7.

For example, when the interchangeable lens LE mounted on the camera body has an available aperture size between F1.2 (corresponding to 0.5 Av) and F22 (corresponding to 9 Av), the micro-computer 1 receives data indicating the maximum aperture size (0.5 Av) from the data producer 7 in a manner which will be described later and also data representing the steps of reduction of aperture size from the terminals d4 to d0 through the data selector MP1. When the data from the terminals d4 to d0 is "00010" indicating that the aperture size is reduced by a 1.0 step from the maximum opened aperture size, the micro-computer 1 carries out a calculation of (0.5 Av)+(1 Av)=(1.5 Av), informing that the aperture size is stopped down to 1.5 Av (corresponding to F1.7).

In this manner, it is possible to control the aperture size with an increment of 0.5 Av. Therefore, according to the above example, the interchangeable lens LE can be selectively set to F1.2 (corresponding to 0.5 Av), F1.4 (corresponding to 1.0 Av), F1.7 (corresponding to 1.5 Av), F2 (corresponding to 2.0 Av), F2.4 (corresponding to 2.5 Av), F2.8 (corresponding to 3.0 Av), F3.4 (corresponding to 3.5 Av), F4.0 (corresponding to 4.0 Av), F4.7 (corresponding to 4.5 Av), and so on up to F22 (corresponding to 9.0 Av) with the increment of 0.5 Av. In the above example, since the interchangeable lens LE has the maximum aperture size of 0.5 Av, which is equal to an integer (i.e., 1, 2, 3, ... ) times 0.5 Av, the interchangeable lens LE changes its aperture size in the order of 1.0 Av, 1.5 Av, 2.0 Av, 2.5 Av, 3.0 Av, 3.5 Av, 4.0 Av and so on, each of which are also equal to an integer times 0.5 Av. Therefore, the controlled aperture size can be given by standard F-stop numbers, such as F1.4, F1.7, F2, F2.4, F2.8, F3.4, F4, etc., as mentioned above.

With the above arrangement, a problem arises in the case where the interchangeable lens LE has a maximum aperture size which is not equal to an integer times 0.5 Av, that is, an interchangeable lens LE which has a maximum aperture size, such as F2.5 (corresponding to 2.64 Av), F3.5 (corresponding to 3.61 Av), F1.8 (corresponding to 1.7 Av), F4.5 (corresponding to 4.34 Av), or F6.3 (corresponding to 5.31 Av). The above type of lenses are referred to as non-standard type, in contrast to standard type lenses having a maximum aperture size equal to an integer times 0.5 Av. For example, in the case of non-standard lens having a maximum aperture size of F2.5 (referred to as a F2.5 lens), the actual reduction of aperture size with the increment of 0.5 Av results in aperture size settings of 3.14 Av, 3.64 Av, 4.14 Av, 4.64 Av and so on. These aperture size settings are not appropriate because any user is not familiar with such a series of F-stop numbers. For the sake of users' convenience, accordingly, the F2.5 lens is given with a series of F-stop number indications: F2.5 (corresponding to 2.64 Av); F2.8 (corresponding to 3.0 Av); F3.4 (corresponding to 3.5 Av); F4 (corresponding to 4.0 Av); and so on (note that the first increment is less than 0.5 Av). However, if the above series of F-stop numbers are given to the F2.5 lens employing the system of the present invention, particularly the arrangement shown in FIG. 4, there will be a difference between the actual aperture size and the aperture size indicated on the lens.

In order to solve this problem, one may attempt to shift, for the non-standard type lens, the first click position K1 of the brush VT to a position intermediately between the standard click positions K1 and K2, and to provided means for detecting the distance from the modified click position K1 to the click position K2. However, such a distance detecting means requires an additional arrangement, for example, an electrode array where the number of bits of the digital signal representing the position K1 has to be increased. This not only increases an area necessary to arrange the code patterns, but also makes their arrangement more complex.

According to the camera system of the present invention, no matter whether the mounted lens is standard type or non-standard type, the brush VT stays at the standard first click position K1 when the aperture setting ring 11 is set to a position representative of the maximum aperture size. According to this design, if the mounted lens is a standard type, the aperture size is to be controlled to a position equal to an integer times 0.5 Av when the aperture setting ring is so rotated as to locate the brush VT in any one of the clicking positions K1 to K21 (In some lenses, the control ring can not rotate as far as K21.).

On the contrary, if the mounted lens is a non-standard type, e.g., F2.5 lens having maximum aperture size of F2.5 (2.64 Av), the shifting of the brush VT from the position K1 to K2 accompanies rotation of aperture setting ring 11 from the F2.5 (2.64 Av) position to the F2.8 (3.0 Av) position. On the other hand, the shifting of brush VT from position K1 to K2 causes a real change in aperture value by 0.5 Av. In this case, notwithstanding the fact that the reduction of the aperture size in terms of the indication on the aperture setting ring 11 is 0.36 Av, the terminals d4 to d0 produce a signal "00001" representing the 0.5 Av reduction of the aperture size when the brush VT is set to the position K2. Therefore, if the real value, F2.5 (2.64 Av) is adopted as the fixed data representative of the fully open aperture size, the set aperture size at K2 position would correspond to 2.64 Av+0.5 Av=3.14 Av, which differs from 3.0 Av indicated on the aperture setting ring 11. To avoid this, the fixed data for the fully open aperture size adopts an approximate value rounded into an integer times 0.5 Av instead of the real value, e.g., F2.4 (2.5 Av) is preferred rather than the real fully open F-number, F2.5 (2.64 Av) in the case of F2.5 lens. Thus, the set aperture size at the K2 position corresponds to 2.5 Av+0.5 Av=3.0 Av as in the indication on the aperture setting ring 11. As to the information relating to the real fully open aperture size, another fixed data represents the difference between the real value and the approximate value. For example, in the case of F2.5 lens having maximum aperture size of F2.5 (2.64 Av), the microcomputer 1 receives fixed data of 2.5 Av as the estimated, or approximate, maximum aperture size, and, at a different time, fixed data of 0.14 Av as the difference between the real value 2.64 Av and the approximate value 2.5 Av. In the micro-computer 1 the addition of 2.5 Av+0.14 Av=2.64 Av is carried out to obtain the real maximum aperture size, i.e., 2.64 Av, when the brush VT is set to the position K1.

According to the above arrangement of the set aperture size signal producing device AS according to the present invention, a signal representing the set aperture size can be obtained with a high reliability, regardless of a type of lens mounted on the camera body. Furthermore, since the brush VT slides over an electrode pattern having, not a linear, but a discrete change, and since the brush VT is set to a position K1 to K21 by a click mechanism, less error is caused by the brush VT.

The above-mentioned relation is further discussed in general terms using characters: Avs representing set aperture size; Avo representing true and precise maximum aperture size; Av'o representing approximate maximum aperture size; and dAvo (=Avo−Av'o) representing a difference between the true and approximate maximum aperture sizes. First, the brush VT is shifted by the aperture setting ring 11 to one of the click positions K1 to K21, whereby the set aperture size signal producing device AS produces from its terminals d4 to d0 a signal corresponding to Avs−Av'o. This data Avs−Av'o is applied to the micro-computer 1. Furthermore, the micro-computer 1 is provided with the fixed data Av'o and dAvo from the data producer 7 (FIG. 1) in the lens LE. By using these data, the micro-computer 1 carries out the following calculations:

$$(Avs-Av'o)+Av'o=Avs \qquad (1)$$

$$Av'o+dAvo=Avo \qquad (2)$$

thus, obtaining the set aperture size Avs and true maximum aperture size Avo.

It is to be noted that a problem occurs if the degree of rotation effected in the aperture setting ring 11 is the same as that effected in the pin 15 in the interchangeable lens LE of the non-standard type. In other words, in the above system of the present invention, the rotation of the aperture setting ring 11 from K1 to K2 positions is equal to that from K2 to K3 positions, i.e., 0.5 Av, while the true stopping-down step to be effected by pin 15 correspondingly to the rotation of the aperture setting ring 11 is 0.36 Av. Pin 15 would, however, stop-down the aperture by 0.5 Av if the degree of rotation is equal to that of aperture setting ring 11.

Therefore, the pin 15 of a non-standard lens is so arranged as to carry out a play rotation and effective rotation to reduce the aperture size by an amount less than 0.5 Av when shifting the brush VT from the position K1 to K2. For example, in the case of F2.5 lens having the maximum aperture size of 2.64 Av, the pin 15 carries out, when shifting the brush VT from the position K1 to K2, play rotation by 0.14 Av and effective rotation that effects the reduction of aperture size by an amount of 0.36 Av. Similarly, in the case of F3.5 lens having the maximum aperture size of 3.61 Anv, the pin 15 carries out, when shifting the brush VT from the position K1 to K2, play rotation and effective rotation that effects the reduction of aperture size by an amount of 0.39 Av. Furthermore, in the case of F1.8 lens having the maximum aperture size of 1.7 Av, the pin 15 carries out, when shifting the brush VT from the position K1 to K2, play rotation by 0.2 Av and effective rotation that effects the reduction of aperture size by an amount of 0.3 Av.

It is to be noted that each standard and non-standard lens has a pin 15 which carries out an effective rotation that effects the reduction of aperture size by an amount of 0.5 Av when shifting the brush VT from the position Kn to K(n+1), wherein n is an integer equal to or greater than 2.

Figure 5:
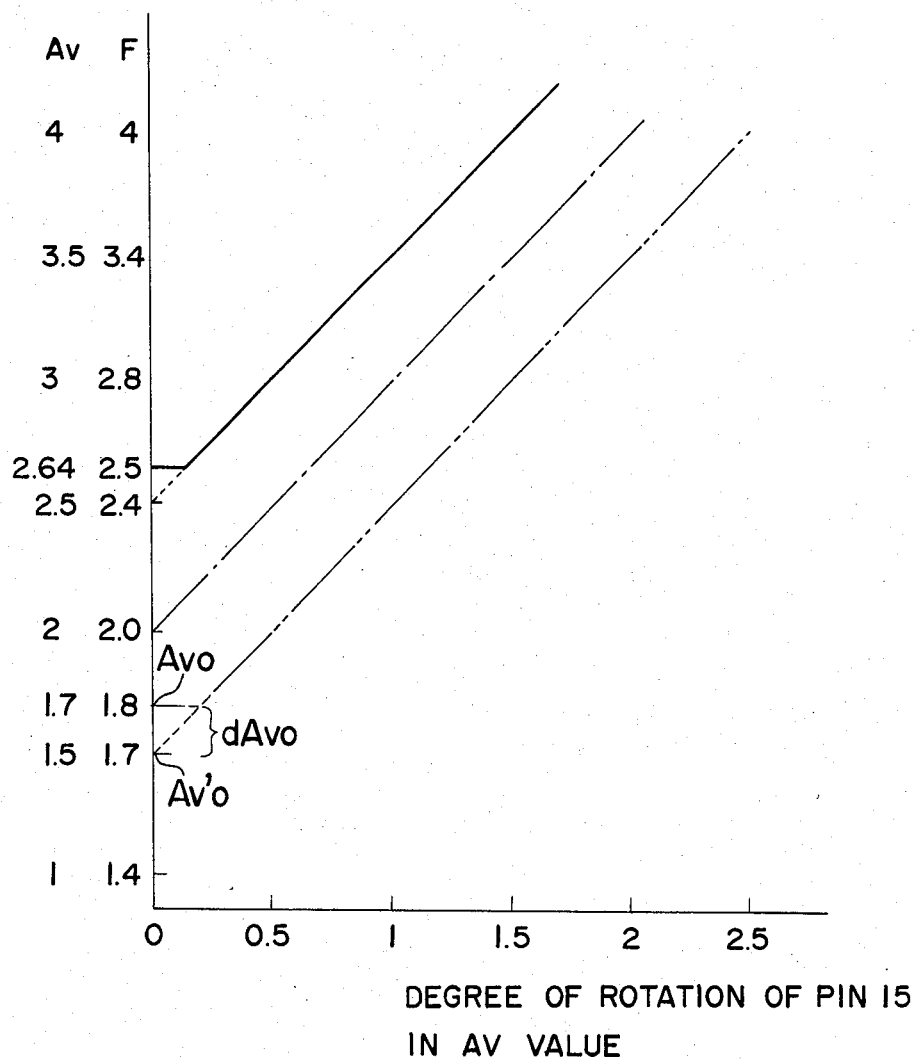
FIG. 5 is a graph showing a relationship between the degree of stop-down in Av (APEX value) and the actual aperture size of various interchangeable lens.

Referring to FIG. 5, a graph showing the above relationship is given, wherein abscissa and ordinate represent degree of rotation of the pin 15 and the aperture size of the diaphragm, respectively. In the case of a standard type lens, such as an F2 lens as indicated by a single dot chain line, the difference dAvo is zero and, therefore, a slope indicating the effective rotation begins from the very beginning of the line, that is, from the very beginning of the movement of the pin 15. Therefore, the degree of rotation of the pin 15 is proportional to the degree of change of aperture size from the beginning of rotation of the pin 15. Thus, by comparing a data (Av−Av'o)=(Av−Avo) with the degree of rotation of the pin 15, wherein Av is a desired aperture size, it is possible to obtain the desired aperture size Av by stopping the rotation of the pin 15 when these two match with each other.

On the other hand, in the case of a non-standard type lens, such as an F2.5 lens as indicated by a solid line or an F1.8 lens as indicated by a double dot chain line, the pin 15 carries out the play rotation at the beginning for an amount less than 0.5 Av and, thereafter, the slope indicating the effective rotation begins. During the play rotation, the pin 15 moves an amount corresponding to dAvo, and in this period, the aperture is maintained to the fully opened condition. Thereafter, the pin 15 carries out the effective rotation as if it has been carrying out the effective rotation from the approximate maximum aperture size Av'o. Thus, by comparing a data (Av−Av'o) with the degree of rotation of the pin 15, it is possible to obtain the desired aperture size Av by stopping the rotation of the pin 15 when these two match with each other, as in the same manner as the standard type lens.

The arrangement of the above described lenses can be accomplished by employing a known cam arrangement in the diaphragm control mechanism.

Referring back to FIG. 1, the set exposure time signal producing device TS produces a digital signal representing a manually set exposure time by way of an exposure time setting device (not shown) provided in the camera body. The output of the set exposure time signal producing device TS is connected to input IP4 of the data selector MP1.

The film sensitivity signal producing device SS produces a digital signal representing a manually set film sensitivity by way of a film speed setting device (not shown) provided in the camera body. The output of the film sensitivity signal producing device SS is connected to input IP5 of the data selector MP1.

And, the mode signal producing device MS produces a digital signal representing a manually selected mode by way of a mode selecting device (not shown), from a number of modes which are: exposure control mode; and a flash-light photographing mode wherein the mode signal producing device MS receives from the flash-light device FL through terminal JF1 of flash-light device side and terminal JB5 of camera body side, a charge completion signal indicating that a main capacitor (not shown) in the flash-light device FL is fully charged. The output of the mode signal producing device MS is connected to input IP6 of the data selector MP1.

Figure 7A:
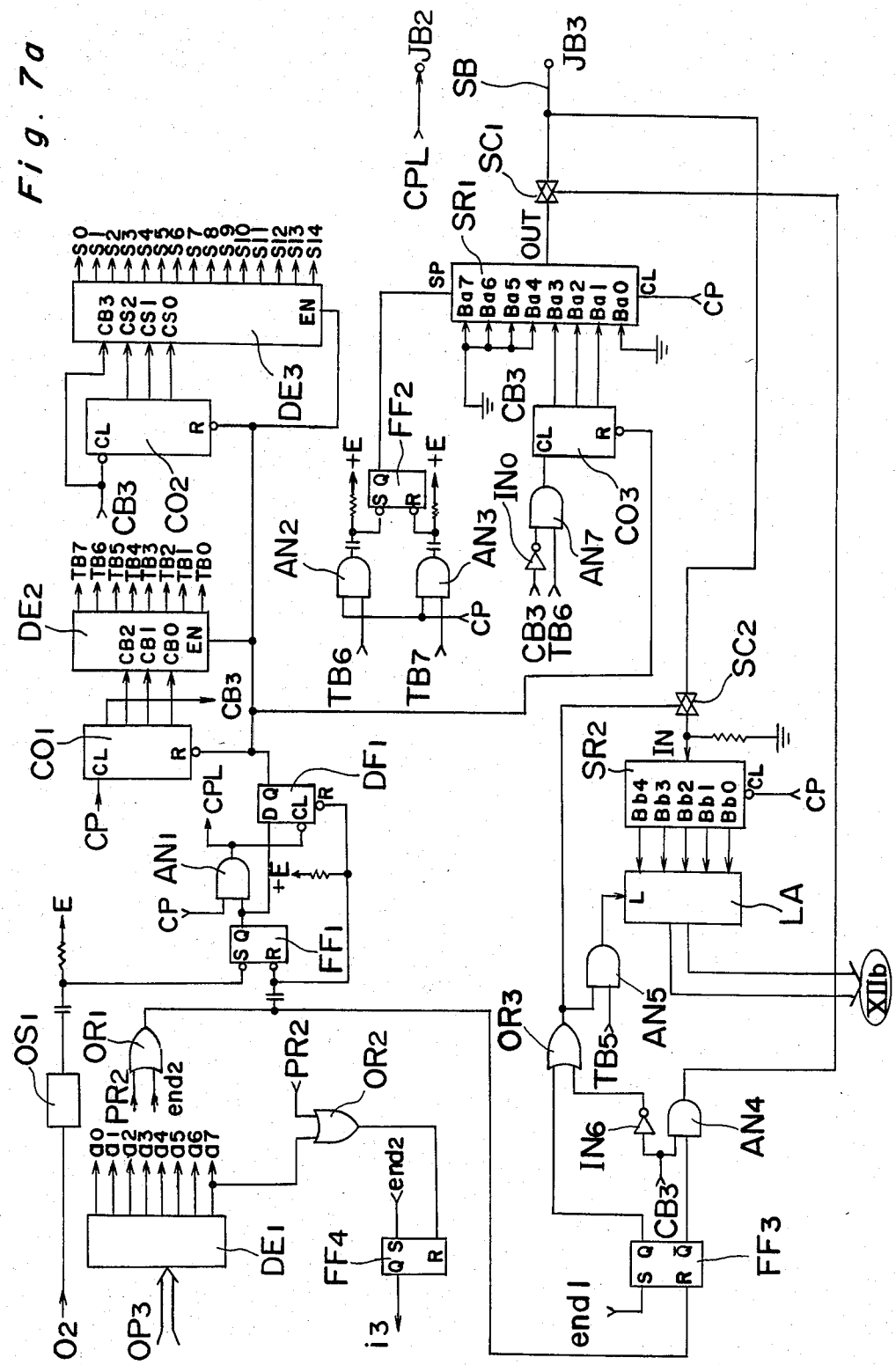

An interface circuit IF reads various data from the lens LE when it receives a "HIGH" from an output O2 of the micro-computer 1. When the interface circuit IF completes reading the data from the lens LE, the read data are sequentially produced from the interface circuit IF and transmitted through data selector MP1 and external data bus DB to the micro-computer 1 in response to the 4-bit data from an output OP3 of the micro-computer 1. A detail of the interface circuit IF is shown in FIGS. 7a and 7b and will be described later.

The data selector MP1 has inputs IP1 to IP6 for receiving various data and transmits this data through the data bus DB to the micro-computer 1 in a selected sequence controlled by a 4-bit signal applied thereto at a selection terminal SL from the output OP3 of the micro-computer 1. A relationship between the data applied to the selection terminal SL of the data selector MP1 and the data produced from the data selector MP1 through the data bus DB is shown in Table 2 below.

TABLE 2

| Data Selector (MP1) | | | |
|---|---|---|---|
| Selection Terminal SL | | Data Bus (DB) | |
| | | Selected terminal | Signification |
| 0 0 0 0 | (0H) | IP4 | Tvs |
| 0 0 0 1 | (1H) | IP5 | Sv |
| 0 0 1 0 | (2H) | IP6 | Mode |
| 0 0 1 1 | (3H) | IP2 | Measured light amount |
| 0 1 0 0 | (4H) | IP3 | Avs-Av'o |
| 0 1 0 1 | (5H) | IP1 | Interface |
| . | | " | " |
| . | | | |
| . | | | |
| 1 1 0 0 | (CH) | " | " |

As apparent from Table 2, the data applied to the selection terminal SL is 4-bit long, and for the sake of brevity, this 4-bit signal is also indicated with a hexadecimal numbering system, as shown in parentheses in Table 2. When the data applied to the selection terminal SL from the output OP3 is "0H" (i.e., 0 hexadecimal, the data selector MP1 selects exposure time data Tvs inputted to the terminal IP4; when the data to the selection terminal SL is "1H", the data selector MP1 selects film sensitivity data Sv inputted to the terminal IP5; when the data to the selection terminal SL is "2H", the data selector MP1 selects exposure control mode data inputted to the terminal IP6; when the data to the selection terminal SL is "3H", the data selector MP1 selects measured light amount data inputted to the terminal IP2; when the data to the selection terminal SL is "4H", the data selector MP1 selects set aperture size data Avs−Av'o inputted to the terminal IP3; and when the data to the selection terminal SL is any one of "5H" to "CH", the data selector MP1 selects data concerning the lens LE inputted to the terminal IP1 from the interface circuit IF. The selected data by the data selector MP1 is applied to the micro-computer 1 through the data bus DB.

It is to be noted that the interface circuit IF produces the read data from the lens LE in a sequence controlled by the data "5H" to "CH" from the output OP3. It is also to be noted that the micro-computer 1 only produces data "0H" to "3H" when the signal to the input i4 is "LOW", i.e., when the lens detecting switch LS is maintained off, whereby no signal related to the lens LE is fed to the micro-computer 1.

A reference character FC designates a flash-light control for controlling amount of flash-light to be emitted from the flash-light device FL from the camera side. The flash-light control FC produces an emission-start signal which is applied to the flash-light device FL through terminal JB6 of camera side and terminal JF2 of flash device side for effecting the emission of flash light. Also, the flash-light control FC produces a emission-stop signal which is applied to the flash-light device FL through terminal JB7 of camera side and terminal JF3 of flash device side for stopping the emission of flash light. The emission-start signal is produced, e.g., when the shutter is fully opened, and the emission-stop signal is produced, e.g., when an integrated amount of light reflected from an object to be photographed and passed through an objective lens and further reflected on a film surface reaches a predetermined level. When the main capacitor (not shown) provided in the flash-light device FL is charged to a predetermined level, the flash light device FL produces a "HIGH" which is applied to the terminal JF1 and, thereafter, by the emission-start signal from the terminal JF2, a xenon lamp (not shown) provided in the flash-light device FL starts to emit light. Then, by an emission-stop signal from the terminal JF3, the xenon lamp stops the light emission.

A release switch RS is provided to close relative to the operation of a shutter release mechanism. A safety switch CS is provided, which closes upon completion of film wind-up for one frame and opens upon completion of exposure control operation, thereby preventing the shutter from being released before it is ready to take a photograph. The release switch RS and the safety switch CS are connected, respectively, to inverters IN3 and IN4, which are in turn connected to two inputs of an AND gate AN0. An output of the AND gate AN0 is connected to an insertion input i5 of the micro-computer 1.

The micro-computer 1 has an output O1 which is connected to a release circuit RL. When the output O1 produces a "HIGH", the release circuit RL starts shutter release operation. The output O1 is also connected to an inverter IN2 which is further connected to a base of a transistor BT1 through a suitable resistor. Therefore, even if the light measuring switch MS is turned on during the shutter release, the transistor BT1 maintains the conductive state.

The micro-computer 1 has an output O2 connected to the interface circuit IF. The output O2 produces a "HIGH" when the interface circuit IF is reading data from the lens. The output O2 is further connected to an inverter IN5 and, in turn, to a base of a transistor BT2 through a suitable resistor. Thus, when the output O2 is producing a "HIGH", the inverter IN5 produces a "LOW" causing turn on of the transistor BT2. Thus, electric power is supplied through the power lines +VB and +VL, terminal JB1 of camera body and terminal JL1 of lens, to circuits in the lens.

In the lens LE, a data producer 7 is provided including a ROM RO1 (FIG. 8) previously stored with various data related to the lens. The clock pulses CPL produced from the interface circuit IF in the camera body are applied to the data producer 7 as a synchronizing signal through a terminal JB2 on camera and a terminal JL2 on lens so as to control the transmission of address signals from the interface circuit IF to the data producer 7 and the transmission of read out data from the data producer 7 to the interface circuit IF through the same path defined by a line SB, a terminal JB3 on the camera and terminal JL3 on the lens. A block 9 encircled by a broken line is an information producing device, and it includes a focusing distance data producing device DS, which produces a data corresponding to a focusing distance of a mounted interchangeable lens as set by the turning of a focusing distance control ring (not shown), and a focal length data producing device FS, which produces a data corresponding to a focal length of a mounted zoom lens as set by the turning of a zooming ring (not shown). The data produced from the focusing distance data producing device DS and from the focal length data producing device FS are applied to the data producer 7 as address signals specifying a particular location in the ROM RO1. Thus, the ROM RO1 produces data corresponding to the set focusing distance (in absolute amount) or set focal length (in absolute amount). It is to be noted that each of the focusing distance data producing device DS and the focal length data producing device FS can be formed by an arrangement similar to that of the set aperture size signal producing device AS shown in FIG. 4. The operation of the above described camera system is given hereinbelow.

Figure 6A:
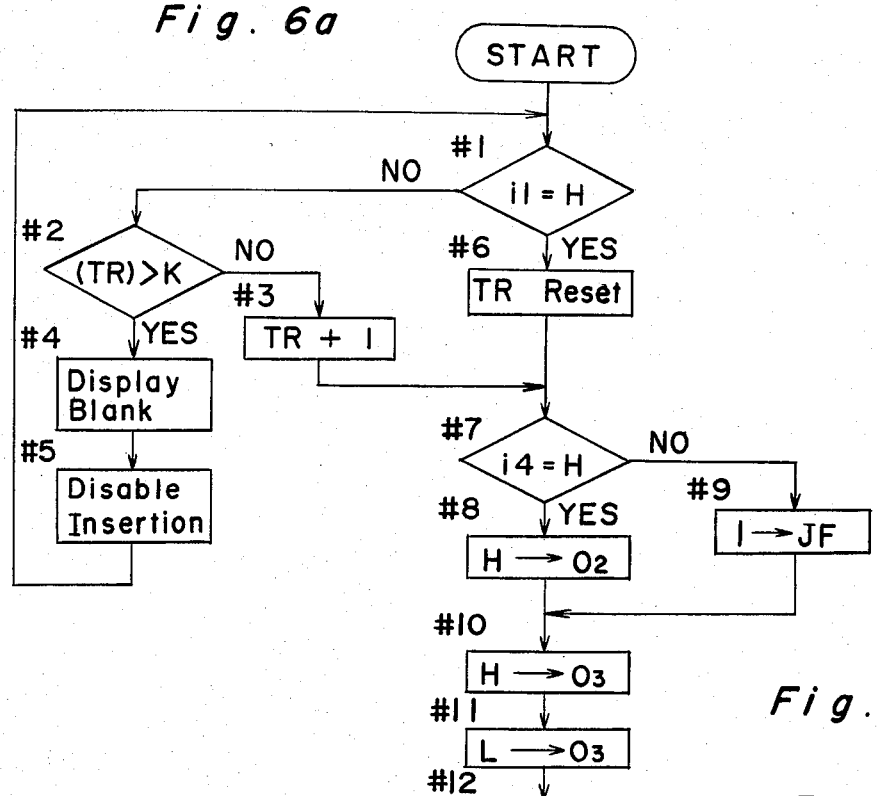
FIGS. 6a and 6b taken together as shown in FIG. 6 show a flow chart of the operation of the camera system according to the present invention.
Figure 6:
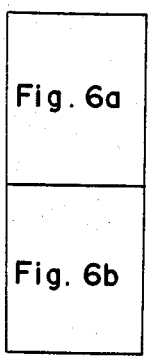
FIG. 6c is a flow chart of an insertion operation to be carried out within a flow of FIGS. 6a and 6b.
Figure 6C:
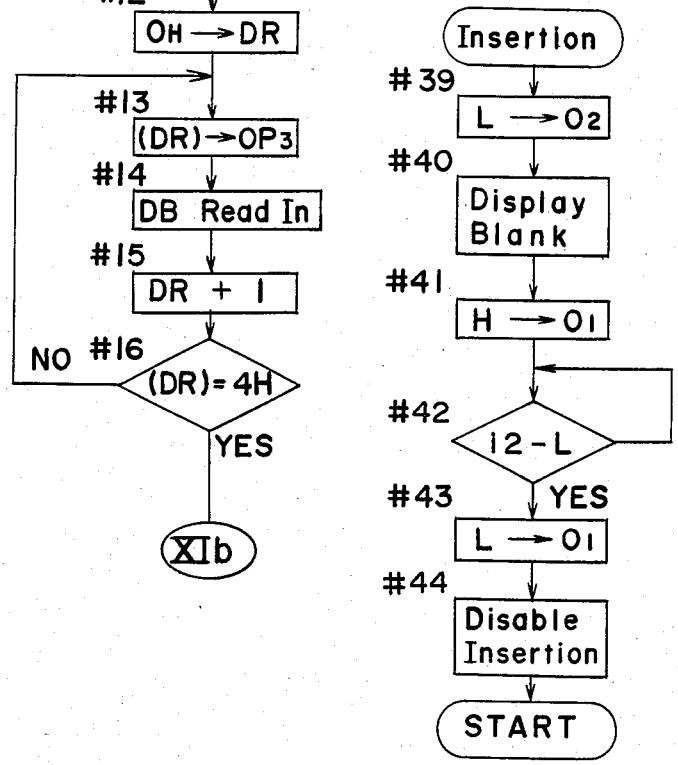
Figure 6B:
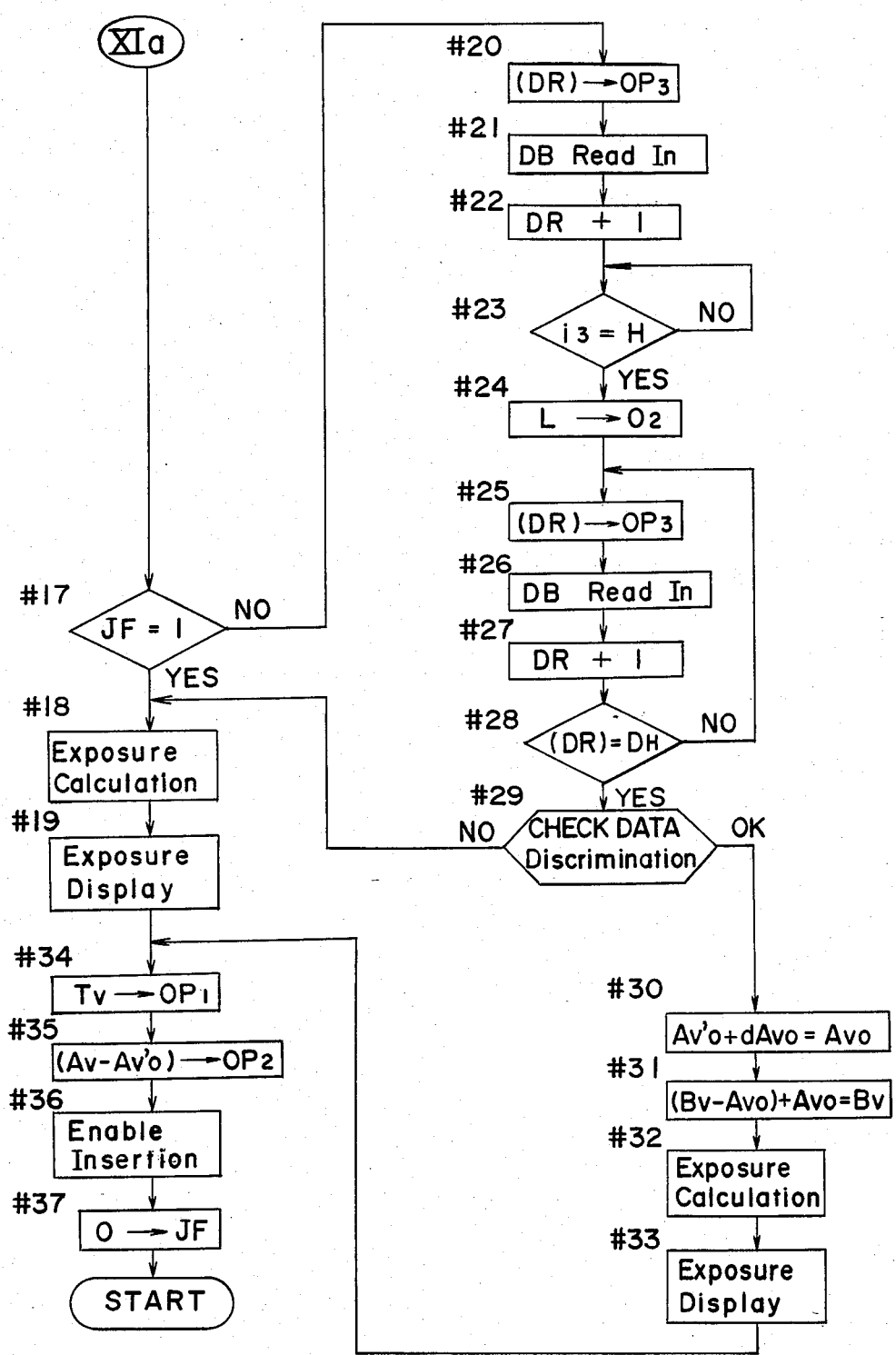

Referring to FIGS. 6a, 6b and 6c, a flow chart of sequential operation of the micro-computer 1 is shown. In the step #1, it is determined whether the input i1 is carrying "HIGH" or not, i.e., whether the light measuring switch MS is turned on or not. If light measuring switch MS remains open to provide "LOW" to the input i1, the procedure advances to the step #2 and further to the step #3 or to the steps #4 and #5; the detail will be described later. When the light measuring switch MS is turned on to provide "HIGH" to the input i1, the procedure advances from the step #1 to #6 so as to reset a timer register TR for counting time. A detail of this timer register TR will also be described later.

Then, in the step #7, it is determined whether the input i4 is carrying "HIGH" or not, i.e., whether the lens detecting switch LS is turned on or not. When the input i4 is receiving "LOW", the procedure advances to the step #9 for setting "HIGH" in a 1-bit discrimination register JF and, then, advances to the step #10. On the other hand, when the input i4 is receiving "HIGH", the procedure advance to the step #8 so as to produce "HIGH" from the output O2 of the micro-computer 1. Thus, the inverter IN5 produces "LOW" to conduct the transistor BT2, resulting in supply of electric power to the circuits 7 and 9 in the lens LE and, at the same time, interface circuit IF is so actuated to read data from the lens. Thereafter, the procedure advances to the step #10.

A further detailed operation will be described later in connection with FIGS. 7a and 7b, but here, it is to be noted that the circuits in the lens are reset by a power-on-reset signal that starts the power supply caused by a "HIGH" produced from the output O2, and thereafter, the system is in a condition ready to transmit data from the lens to the camera body. By the above arrangement, the terminal for the power supply can be used also for transmitting a start signal for starting the data read out, thereby reducing the number of terminals that interconnect the camera body and camera accessory, e.g., lens. Such a reduction of the number of the terminals not only reduces the manufacturing cost, but also increases the reliability and durability of the camera system.

In the step #10, the micro-computer 1 produces "HIGH" from its output O3 and, in the succeeding step #11, the output O3 is turned to "LOW", whereby an A-D conversion start pulse is applied to the A-D converter AD for starting the A-D conversion of light signal produced from the light measuring circuit ME. Then, a 4-bit data "0H" is set up in a data register DR (not shown) and then, the micro-computer 1 produces the 4-bit data "0H" from its output OP3. In response to the 4-bit data "0H", the data selector MP1 produces the exposure time data Tvs inputted to the terminal IP4, and the produced data Tvs is sent through the data bus DB to the micro-computer 1 wherein the data Tvs is stored in a certain resistor. Then, in the step #15, "1" is added to the content of the register DR. And, in the step #16, it is determined whether the register DR is carrying "4H" or not. If not, the procedure returns back to repeat the steps #13, #14 and #15.

Therefore, until the register DR carries "4H", the micro-computer 1 reads in various data from the data selector MP1 such that: when the register DR is carrying "0H", the exposure time data Tvs is read in as mentioned above; when the register DR is carrying "1H", the film sensitivity data Sv is read in; when the register DR is carrying "2H", the data representing the exposure control mode is read in; and when the register DR is carrying "3H", the data Bv−Avo representing the brightness of the object is taken in. It is to be noted that by the time when the register DR is carrying "3H", the A-D conversion of light signal in the A-D converter AD is completed and, therefore, by this time, the A-D converter AD is applying the converted light signal to the input IP2 of the data selector MP1. Then, when the register DR carries "4H", the procedure advances to the step #17.

In the step #17, it is determined whether the content of 1-bit register JF is "1" or not. If the content is "1" as occurred when the lens detecting switch LS is maintained off, the procedure advances to the step #18 in which exposure calculation effected in the case of no lens, as will be described later, is carried out. Contrary, If the content of the register JF is "0" as occurred when a lens is mounted and the lens detecting switch LS is turned on, the procedure advances to the step #20 wherein the content of the register DR, which is at present "4H", is outputted from the output OP3. By this signal, the data selector MP1 takes in the data Avs−Av'o applied to its terminal IP3 and, in the step #21, the micro-computer 1 reads in the data Avs−Av'o through the data bus DB. Then in the step #22, "1" is added to the content of the register DR, thus, the register DR is now holding "5H".

Then, in the step #23, the micro-computer 1 waits until the input i3 receives "HIGH" from the interface circuit IF indicating that all the fixed and variant data from the lens are now stored in the interface circuit IF. Since the moment when the output O2 produces "HIGH" at the step #8, the interface circuit IF has been repeating a cycle of operation of producing serially an address signal which is applied through the line SB and terminals JB3 and JL3 to the ROM RO1 provided in the data producer 7 and receiving serially fixed data stored at designated location in the ROM RO1 through the same path. When this cycle of operation is repeated for a number of times to store all the fixed data in the interface circuit IF, the information producing circuits DS and FS provided in the lens are actuated to produce address signals for designating locations in the ROM RO1, whereby variant data such as focusing distance data as set by the amount of shift of the lens and focal length data as set by zooming the lens are transmitted from the ROM RO1 to the interface circuit IF in the camera body. When all the fixed and variable data are stored in the interface circuit IF, the interface circuit IF produces "HIGH" which is applied to the input i3 of the micro-computer 1.

When the input i3 receives "HIGH", the procedure advances to the step #24 for producing "LOW" from the output O2, thereby turning the transistor BR2 to a non-conductive state for stopping the power supply from the power-line +VL to the lens. Then, in the steps #25 et seq., the micro-computer 1 reads in the data stored in the interface circuit IF.

Before describing the operations carried out in the steps #25 et seq., the operations up to the step #24 are summarized hereinbelow.

First, the address data for designating a location in the ROM RO1 provided in the data producer 7 is transmitted from the camera body to the lens, and the fixed data stored in the designated location in the ROM RO1 is transmitted from the lens to the camera body. This operation is repeated for a number of times to transfer all the fixed data to the camera body. Then, coded information data produced from the information producing circuit 9 are used without any change as address data to designate locations in the ROM RO1, thereby variant data stored in the ROM RO1 are transmitted to the camera body.

With the above arrangement, the fixed data and the variant data are transmitted from the ROM RO1 to the camera body through the same path, whereby only one pair of interconnecting terminals are necessary; one terminal JB3 on camera body and other terminal JL3 on lens. Whereas according to the prior art, the fixed data and variant data are transmitted through different paths, requiring two pairs of terminals. The information producing circuit 9 has a circuit arrangement similar to that shown in FIG. 4, whereby it produces a coded data corresponding to an amount of shift from a reference position. Since the ROM RO1 produces data in absolute value based on the data from the information producing circuit 9, the arrangement of the information producing circuit 9 is very simple when compared with an arrangement of a prior art producing circuit that directly produces the data in absolute value from the coded pattern, because the information producing circuit 9, according to the present invention, produces data which has less bits than that produced from the prior art producing circuit. Furthermore, the information producing circuit 9, according to the present invention can be assembled in a compact size with a small coded pattern. Moreover, since the transmission of address signal from the camera body to the lens and the signal transmission of read out data from the lens to the camera body are carried out alternately at different times, only one pair of interconnecting terminals are necessary for the mutual transmission, thereby reducing the number of terminals between the camera body and the lens.

Referring back to FIG. 6b, when the input i3 receives "HIGH", the micro-computer 1 starts to sequentially read in the data temporarily stored in the interface circuit IF, in the step #25. This operation is carried out in the following steps. The output OP3 sequentially produces data "5H" to "CH", each designating a particular data. The produced data "5H" to "CH" are sequentially applied both to the interface circuit IF and to the data selector MP1. When the data produced from the output OP3 is "5H", the interface circuit IF produces check data. Similarly when the output is "6H", data Av'o representing approximate maximum aperture size is produced; when the output is "7H", data Avm representing the minimum aperture size is produced; when the output is "8H", data dAvo representing the difference between the actual and approximate maximum aperture size is produced; when the output is "9H", data fw representing the shortest focal length is produced; when the output is "AH", data ft representing the longest focal length is produced; when the output is "BH", data representing set focusing distance is produced; and when the output is "CH", data representing set focal length is produced. In this case, the data applied to the terminal IP1 of the data selector MP1 is outputted through the data bus DB in a manner shown in Table 2. And, the micro-computer 1 sequentially takes in the data through the data bus DB. When the micro-computer 1 has taken in all the data from the interface circuit IF, the content of the register DR becomes "DH", thereby the step advances from #28 to #28.

The transmission of the data from the lens to the micro-computer 1 can be summarized as follows. First, each data is transmitted serially to the interface circuit IF in which the data is temporarily latched, each data comprising a plurality of bits. Then, in response to the signals from the micro-computer 1 each designating a particular data, the temporarily latched data are transmitted to the micro-computer 1 one after another, with each data being transmitted parallelly. While the interface circuit IF is temporarily storing the data from the lens, the micro-computer 1 is reading other data. This arrangement has an advantage in time saving when compared with an arrangement wherein data is taken into the micro-computer serially bit-by-bit.

In the step #29, it is determined whether or not a check data, which is produced when and while the lens is properly mounted on the camera, is included in the data from the interface circuit IF. If the lens is mounted properly, the micro-computer 1 first receives the check data having a code which is common to all the lens. When the check data is present, the procedure advances to the step #30; but when it is absent, the procedure advances to the step #18. The absence of the check data occurs not only when the lens is improperly mounted, but also when a camera accessory, such as a bellows, a reverse adaptor, a teleconverter, an extension ring, or the like, is mounted between the camera body and the lens.

In the step #30, a following calculation (2) is carried out using the read in data Av'o and dAvo, $$Av'o + dAvo = Avo \qquad (2)$$

so as to obtain the true maximum aperture size Avo. Then, in the step #31, a following calculation (3) is carried out using the read data Bv−Avo and the above calculated data Avo, $$(Bv - Avo) + Avo = Bv \qquad (3)$$

thereby obtaining the data Bv representing the brightness.

Then, in the step #32, an exposure calculation based on the selected mode of exposure control is carried out. The mode can be selected from any one of: program mode; aperture size preferred mode in which the shutter speed is automatically determined with respect to the preferred aperture size; shutter speed preferred mode in which the aperture size is automatically determined with respect to the preferred shutter speed; manual mode in which aperture size and shutter speed are manually set; and flash-photographing mode in which a photographing is taken with an aid of auxiliary light.

When the program mode is selected, following calculations are carried out.

$$Bv + Sv = Ev \qquad (4)$$

-continued $$p \times Ev = Av \quad (p \text{ is greater than 0 and smaller than 1})$$

$$Ev - Av = Tv$$

$$Av - AV'o$$

When the aperture size preferred mode is selected, following calculations are carried out.

$$Bv + Sv = Ev \tag{5}$$

$$(Avs - Av'o) + Av'o = Avs$$

$$Ev - Avs = Tv$$

When the shutter speed preferred mode is selected, following calculations are carried out.

$$Bv + Sv' = Ev \tag{6}$$

$$Ev - Tvs = Av$$

$$Av - Av'o$$

When the manual mode is selected, following calculations are carried out.

$$Bv + Sv = Ev \tag{7}$$

$$(Avs - Av'o) + Av'o = Avs$$

$$Ev - (Av'o + Tvs) = dEv$$

It is to be noted that in the case where the calculated aperture size or shutter speed is at the extremity, or critical value, of an available range under the program mode, aperture preferred mode or shutter speed preferred mode, the calculations are repeated again to obtain shutter speed or aperture size based on the critical value.

Furthermore, under the flash-photographing mode the following calculations are carried out.

$$Ev - Tvf + h = Avf1 \quad (h \text{ is greater than 0}) \tag{8}$$

$$Iv + Sv - Dv = Avf2$$

wherein Iv is a maximum available light amount from the flash-light device FL, Dv is a photographing distance between camera and object to be photographed as obtained from the information producing device 9 of the lens LE, and Tvf is an APEX value corresponding to flash-photographing synchronizing shutter speed determined by the shutter mechanism (not shown) provided in the camera body. By the calculations (8) an aperture value Avf1 based on exposure value Ev and flash-photographing synchronizing shutter speed Tvf under TTL (through-the-lens) full open average light measuring, and an aperture value Avf2 based on maximum available light amount Iv and photographing distance Dv are calculated. Then, these two aperture values Avf1 and Avf2 are compared with each other. If Avf1 is smaller than or equal to Avf2, $$Avf1 - Av'o$$

indicating a degree of aperture size reduction is calculated and, if Avf1 is greater than Avf2, $$Avf2 - Av'o$$

also indicating a degree of aperture size reduction is calculated.

By either one of Avf1−Av'o or Avf2−Av'o the aperture size is controlled. In the case of flash-photographing, the amount of flash light to be emitted from the flash-light device FL is controlled by the flash control FC provided in the camera body using a data representing an amount of light which has passed through the controlled aperture as described above and reflected on a film surface.

It is to be noted that the aperture size controlled by the aperture value Avf1 is smaller than the aperture size control by the proper aperture value determined by Ev or Tvf by an amount hEv (such as 1Ev).

It is also to be noted that in the case of flash-photographing with synchronizing shutter speed under daylight, sub-object or background is usually located beyond a main object and, therefore, the sub-object will not be sufficiently illuminated by the flash-light. However, such a sub-object will be lighted with more or less intensive light when compared with a case in which the main object is under-exposed by an amount hEv. Furthermore, when the aperture value Avf1 becomes greater than Avf2 during the flash-photographing with synchronizing shutter speed under day-light, it is not appropriate to control the aperture by the use of value Avf1, because the amount of light which is emitted from the flash-light device FL and reaches the main object is insufficient, resulting in under exposure on the main object. In such a case, the aperture is controlled by the use of the value Avf2, resulting in an optimum exposure of the main object. In any event, the system is so controlled as to photograph the main object with an optimum exposure. It is to noted that h is not necessarily be 1 Ev, but can be any other number.

After carrying out the above described calculations, the micro-computer displays various control values, exposure control mode, and warnings, if any, using the calculated value, through the display device DP. Thereafter, the micro-computer carries out the step #34.

In the meantime, when it is determined in the step #29 that no check data from the lens LE is dispatched, the procedure advances to the step #18. Before describing the calculation carried out in the step #18, it is to be noted that the step advances from #17 to #18 even when it is determined that the lens LE is not mounted, so long as the content of the register JF is "1". In the case where the selected mode is an automatic mode, i.e., any one of program mode, aperture preferred mode, or shutter speed preferred mode, it is understood that the photographer desires to obtain the proper exposure settings automatically. When the effective aperture valve of the automatically set aperture is given as Avn, the light measuring circuit LM produces a signal:

$$Bv - Avn$$

and, in the step #18, a calculation $$(Bv - Avn) + Sv = Tv \tag{9}$$

is carried out, so as to control the shutter speed with the calculated value Tv. On the other hand, as to the aperture size, an output "0" is produced so as not to carry out the stop-down of aperture. In other words, in the TTL stop-down light measuring system, the shutter speed is controlled automatically.

On the other hand, when the selected mode is a manual mode, the shutter speed is controlled by a manually set amount and, in this case, an output "0" is produced so as not to carry out the stop-down of the aperture.

Furthermore, when the selected mode is a flash-photographing mode, the shutter speed is controlled by Tvf representing the limit of synchronizing shutter speed. In this case, "0" is produced so as not to carry out the stop-down of the aperture. The amount of light to be emitted from the flash device is determined by the detected light which has been reflected on the film surface and the sensitivity of the film in use. Then, in the step #19, data of the exposure control value, selected mode, warnings, if any, are displayed through the display device DP. Thereafter, the procedure advances to the step #34. In this case, the data related to the aperture size of the lens is transmitted to the camera side and, therefore, such data will not be displayed.

In the step #34, exposure time control data is transmitted from the output OP1 to the exposure time control device CT, and in the step #35, the stop-down degree data $Av-Av'o$ is transmitted from the output OP2 to the aperture control device CA. Then, in the step #36, the insertion terminal i5 is brought to a condition ready to receive "HIGH", thereby enabling the insertion procedure shown in FIG. 6c, which will be described later. Then, "0" is stored in the register JF and, thereafter, the procedure returns back to "START". Here, it is to be noted that "enabling of insertion" means that the terminal i5 is in a condition ready to receive an insertion signal.

When the procedure returns back to the "START", it is determined whether or not the input terminal i1 is receiving "HIGH", as occurred when the light measuring switch MS is turned on. If yes, the procedure so advances as to repeat the above described steps #6 to #37. This procedure is repeated again and again so long as the light measuring switch MS is maintained on. If no, as happened when the input i1 is receiving "LOW", the procedure advances to the step #2, in which it is determined whether a register TR used as a timer is holding a value greater than a predetermined value K, or not. If not, the procedure advances to the step #3 for adding "1" to the content of the register TR and further advances to the step #7 for repeating the above described procedure of data reading, calculation and display. The purpose of providing a routine of steps #1, #2, #3, #7 is to carry out the procedure of #7 to #36 repeatedly for a predetermined number of times (K times) even after the turning of the light measuring switch MS off. Then, when the content of the register TR becomes greater than K, the procedure advances to the step #4 for producing data that effects blanking of the display device DP. Then, in the step #5, it is prohibited to transmit the insertion signal through the input terminal i5 for disabling the insertion. Thereafter, the procedure returns back to the step #1. Then, until the light measuring switch MS is turned on again, a routine of steps #2, #4, #5 and #1 is repeated again and again.

In summary, the micro-computer 1 operates as follows. During the light measuring switch MS is turned on, a successive operation of data reading, calculation and display is repeated again and again, and this successive operation is carried out for a predetermined number of times (until the content of the timer register TR becomes K+1) even after the light measuring switch MS is turned off. This extra repetition is repeated, for example, 15 seconds after the turn-off of the light measuring switch MS.

When one cycle of operation is completed for the first time after the turn-on of the light measuring switch MS, the terminal i5 is brought to a condition ready to receive an insertion signal. Then, after completing the film wind-up of one frame, and when the release switch RS is turned on with the safety switch CS being turned on, the AND gate AN0 produces "HIGH" which is applied to the terminal i5. At this moment, since the system has completed the exposure calculation and is ready to receive the insertion, an insertion procedure, as shown in FIG. 6c, is carried out. It is to be noted that once the exposure data is calculated and, insertion is enabled, the insertion procedure as shown in FIG. 6c can be inserted at any time during the procedure other than the routine procedure of steps #1, #2, #4, #5. When the micro-computer 1 receives the insertion signal to the input i5, the procedure in the micro-computer 1 jumps to a particular address and carries out a procedure stored in the particular address. In order to cope with the insertion procedure requested during the data reading from the lens LE, "LOW" is produced from the output O2 in the step #39, and the data for blanking the display device DP is produced in the step #40. Then, in the step #41, "HIGH" is produced from the output O1 for actuating the release circuit RL and, at the same time, turning the transistor BT1 on by "LOW" from the inverter IN2. Thereafter, even if the light measuring switch MS is turned off, the transistor BT1 continues to hold the conductive state. When the release circuit RL actuates, an exposure control mechanism (not shown) starts its operation.

In the first place, the stop-down operation is carried out by the ring 13, and from the pulse generator PG, a number of pulses corresponding to the degree of rotation of the ring 13 are produced. The aperture control device CA counts the pulses from the pulse generator PG and compares the counted number with the stop-down degree data $Av-Av'o$ obtained from the output OP2 of the micro-computer 1. When the counted number coincides with the data $Av-Av'0$, the aperture control device CA so controls the ring 13 as to stop its rotation, thereby defining the aperture size. In the case where the camera provided with the system shown in FIG. 1 is a single-reflex camera, the flip-up operation of a reflex mirror (not shown) is also carried out simultaneously with the above mentioned aperture setting. When the aperture setting and the flip-up operation of the reflex mirror are complete, a leading curtain (not shown) starts to scan and, at the same time, the exposure time control device CT starts to count exposure time determined by the data obtained from the output OP1.

Particularly, if the selected mode is the flash-photographing mode, the flash control device FC produces, e.g., when the shutter is fully opened, an emission-start signal which is applied to the flash-light device FL through terminal JB6 of camera side and terminal JF2 of flash device side for effecting the emission of flash light. The flash-light control FC integrates the light which has been reflected from an object to be photographed and has passed through an objective lens and further reflected on a film surface, and when the integrated amount reaches a predetermined level, it produces a emission-stop signal which is applied to the flash-light device FL through terminal JB7 of camera side and terminal JF3 of flash device side for stopping the emission of flash light.

Then, regardless of the selected mode, whether it be the flash-photographing mode or daylight-photographing mode, the trailing curtain (not shown) starts to scan when the shutter speed control device CT has a number corresponding to the exposure time data obtained from the output OP1. When the scanning of the trailing curtain completes, the safety switch CS turns off and, thereafter, the reflex mirror flips down and the aperture is fully opened to its maximum size, thereby completing the exposure operation.

By the turn off of the safety switch CS as happened upon completion of the exposure operation, the inverter IN4 produces "LOW", thereby producing "LOW" from the output O1 at the step #43. By the "LOW" from the output O1, the release circuit RL is turned to inoperative and, at the same time, self-holding of the transistor BT1 to conductive state is released. Then, in the step #44, the acceptance of the insertion signal to the insertion terminal i5 is prohibited and, thereafter, the procedure returns back to "START". In this case, if the light measuring switch MS is held turned on, or if it is within 15 seconds from the turn off of the light measuring switch MS, the successive operation of the data reading, calculation and display is carried out repeatedly. Also, if the light measuring switch MS is held turned on with the safety switch CS being turned off, the successive operation of the data reading, calculation and display is carried out repeatedly and, at the same time, the micro-computer 1 is in a condition ready to accept the insertion signal. Under this condition, even if the release switch RS is also turned on, the turn on of the safety switch CS prevents the signal from the release switch RS from being transmitted through the AND gate AN0 and, therefore, no insertion signal will be applied to the micro-computer 1 through the input terminal i5. Therefore, it is possible to prevent the micro-computer 1 from erroneously carrying out the exposure control.

It is to be noted that the successive operation of data reading, calculation and display can be stopped immediately upon turn off of the light measuring switch MS, when the turn off of the light measuring switch MS is carried out after the completion of exposure control operation and before the completion of the film wind up operation, i.e., while the safety switch CS is turned off. This can be done by the following procedure. When it is determined that the input i1 is not receiving "HIGH" in the step #1, it is further determined whether the input i2 is receiving "HIGH" or not in a step before the step #2. When it is determined that the input i2 is receiving "HIGH", the procedure advances to the step #2, but it is determined that the input i2 is not receiving "HIGH", a data K+1 is set up in the timer register TR and, thereafter, the procedure advances to the step #2. In this case, since the content of the timer register TR is already greater than K, the procedure advances from the step #2 to the step #4 and further to the step #5 and, thereafter, repeating the routine procedure of steps #1, #2, #4 and #5. Thus, the successive operation of data reading, calculation and display can be stopped immediately upon turn off of the light measuring switch MS.

The procedure related to the insertion operation can be summarized as follows. Upon closure of the light measuring switch MS, the successive operation of data reading, calculation and display is carried out; and when this successive operation is carried out at least once, data necessary for the exposure control are all prepared, ready for accepting the insertion signal. Thereafter, when the release switch RS is turned on, the insertion signal is applied to the input i5 and, thereupon, the exposure control operation starts immediately. Also, even in a predetermined period of time after the turn off of the light measuring switch MS, the successive operation of data reading, calculation and display is carried repeatedly. During such a period of time, the insertion signal can be accepted to carry out the exposure control operation. Then, when such a period of time passes, the successive operation of data reading, calculation and display stops and, thereafter, no insertion signal is accepted.

In the case where the exposure control is completed but the film wind-up is not completed, the successive operation of data reading, calculation and display is carried out in the same manner as the above. But, in this case, because the AND gate AN0 continues to produce "LOW" even when the release switch RS is turned on, no insertion signal will be accepted and, therefore, no exposure control operation will be carried out by the micro-computer 1.

Furthermore, in the case where the micro-computer 1 is not producing all the data necessary for the exposure control, the micro-computer 1 will not accept the insertion signal when the release switch RS is turned on. Therefore, the micro-computer 1 will not carry out the exposure control operation, thereby avoiding any improper exposure. Contrary, when the release switch RS is turned on with the micro-computer 1 producing all the data necessary for the exposure control, the micro-computer 1 accepts the insertion signal no matter what procedure it is carrying out, thereby the exposure control operation is carried out immediately. Thus, the photographer will not miss any shutter chance. Furthermore, in the case where the release switch RS is turned on with the wind-up operation not completed, the micro-computer 1 will not accept the insertion signal and, therefore, an erroneous operation, such as an exposure control operation carried out while the exposure control mechanism (not shown) is not ready, will not take place.

As has been described above, the camera system according to the present invention has been developed to carry out an exposure control operation (release operation) which utilizes an insertion function of the micro-computer effected by the insertion signal. Also, since the successive operation of data reading from the lens, data reading for the exposure control, exposure calculation and display is carried out repeatedly while the light measuring switch MS is turned on, the change in data, such as change in focusing distance, will be updated immediately, and, therefore, the calculation can be carried out with the updated data. Therefore, no erroneous operation takes place even if the ring is turned after the light measuring switch MS is turned on.

Figure 8:
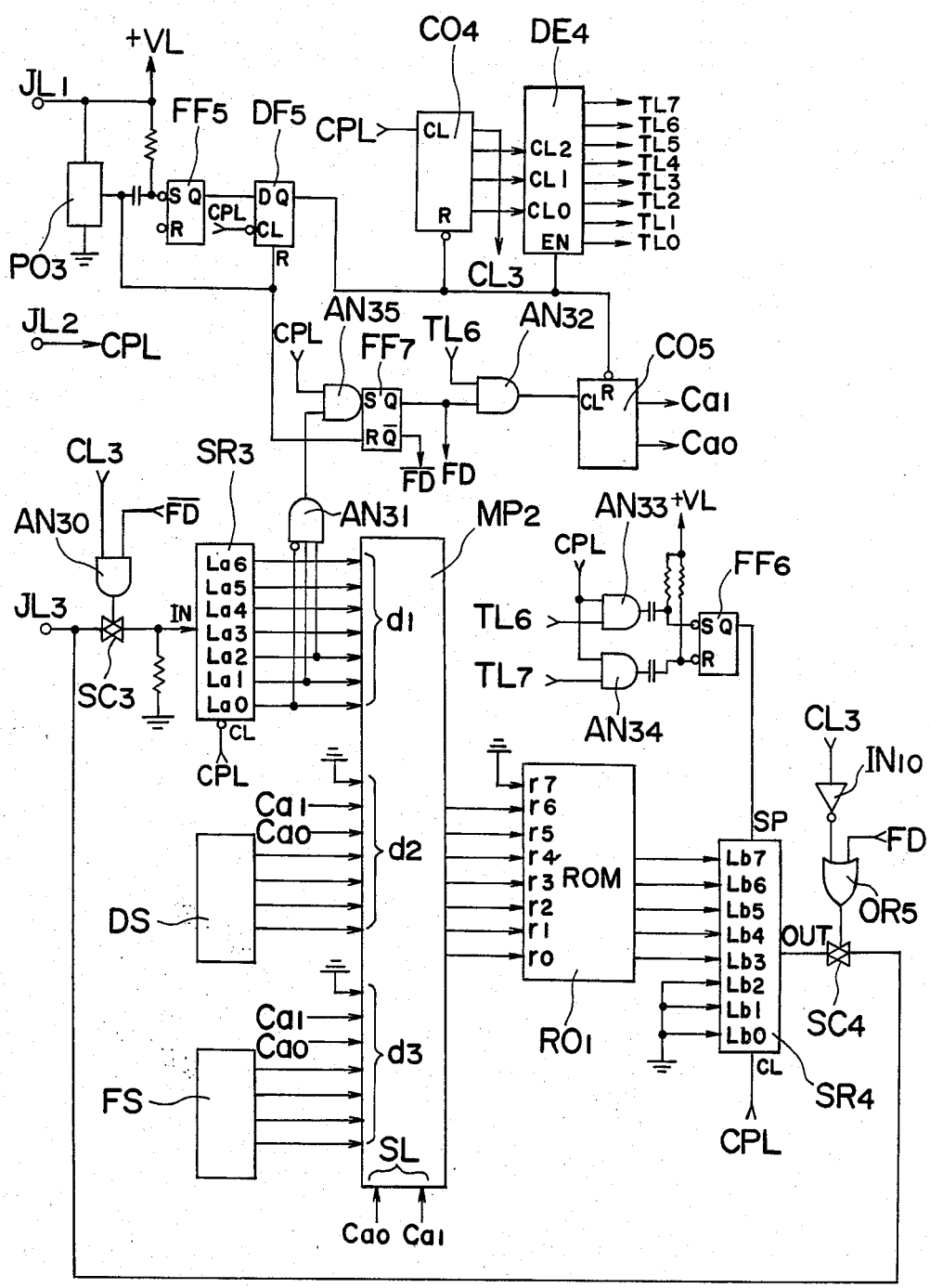
FIG. 8 shows an exemplified circuit diagram of a data producer 7 shown in FIG. 1.
Figure 9:
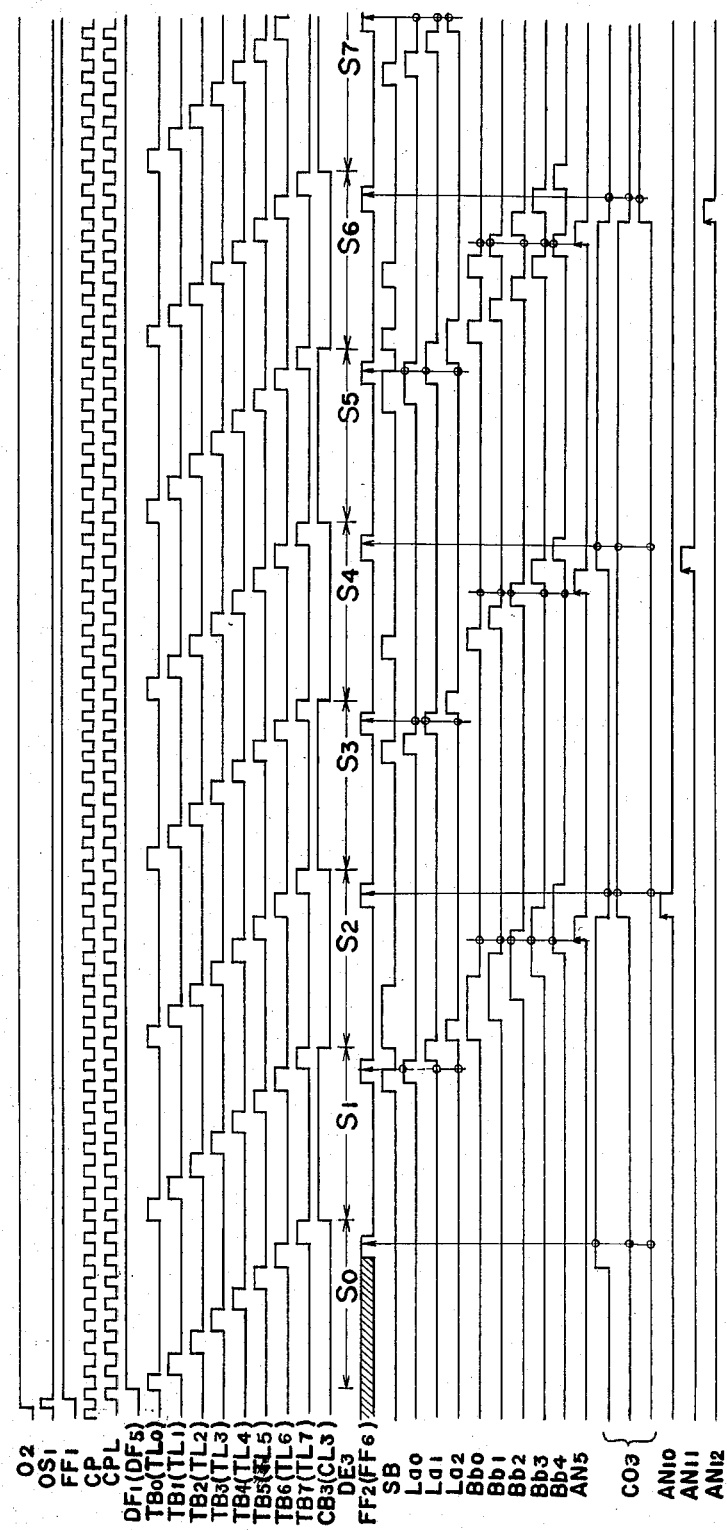
FIGS. 9 and 10 are time charts showing waveforms obtained from the circuit of FIG. 1.
Figure 10:
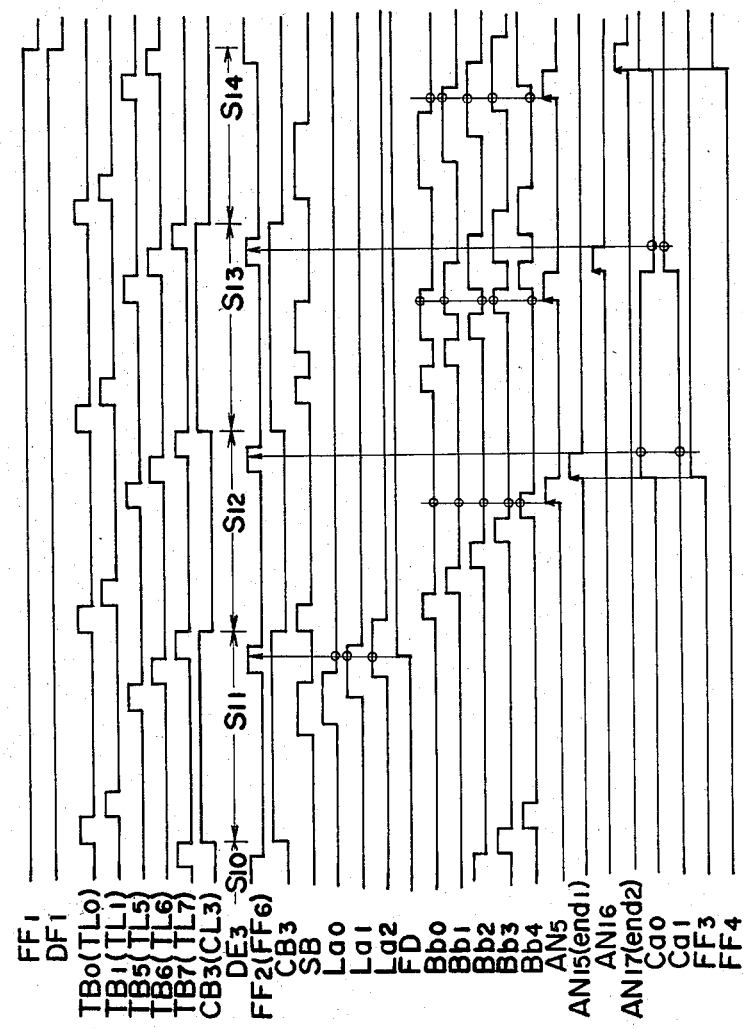

FIGS. 7a and 7b, taken together as shown in FIG. 7 show a circuit diagram which is an example of the interface circuit IF shown in FIG. 1, FIG. 8 shows a circuit diagram which is an example of data producer 7 shown in FIG. 1, FIG. 9 shows a time chart of initial operation of the interface circuit IF, and FIG. 10 shows a time chart of ending operation of the interface circuit IF. Next, the description will be directed to the interface circuit IF and data producer shown in FIGS. 7a, 7b, and 8. First, various data stored in a ROM at various locations with various addresses and the significance of such data will be described with reference to Tables 3 and 4 given below.

TABLE 3

| $a_7$ | $a_6$ | $a_5$ | $a_4$ | $a_3$ | $a_2$ | $a_1$ | $a_0$ | Significance | Meaning | $b_4$ | $b_3$ | $b_2$ | $b_1$ | $b_0$ |
|---|---|---|---|---|---|---|---|---|---|---|---|---|---|---|
| 0 | 0 | 0 | 0 | 0 | 0 | 0 | 1 | Code for Check | | 1 | 1 | 1 | 0 | 0 |
| 0 | 0 | 0 | 0 | 0 | 0 | 1 | 0 | Avo or Av'o | Av'o = 3.5 = F3.4 | 0 | 0 | 1 | 1 | 1 |
| 0 | 0 | 0 | 0 | 0 | 0 | 1 | 1 | Avm | Avm = 9 = F22 | 1 | 0 | 0 | 1 | 0 |
| 0 | 0 | 0 | 0 | 0 | 1 | 0 | 0 | dAvo | dAvo = ⅛ | 0 | 0 | 0 | 0 | 1 |
| 0 | 0 | 0 | 0 | 0 | 1 | 0 | 1 | focal length fw* | fw = 50 mm | 0 | 1 | 0 | 1 | 1 |
| 0 | 0 | 0 | 0 | 0 | 1 | 1 | 0 | focal length ft** | ft = 135 mm | 1 | 0 | 0 | 0 | 1 |
| 0 | 0 | 0 | 1 | 0 | 0 | 0 | 0 | Focusing | 1.4 m | 0 | 1 | 0 | 1 | 0 |
| 0 | 0 | 0 | 1 | 0 | 0 | 0 | 1 | Distance | 1.7 | 0 | 1 | 0 | 1 | 1 |
| 0 | 0 | 0 | 1 | 0 | 0 | 1 | 0 | | 2 | 0 | 1 | 1 | 0 | 0 |
| 0 | 0 | 0 | 1 | 0 | 0 | 1 | 1 | | 2.4 | 0 | 1 | 1 | 0 | 1 |
| 0 | 0 | 0 | 1 | 0 | 1 | 0 | 0 | | 2.8 | 0 | 1 | 1 | 1 | 0 |
| 0 | 0 | 0 | 1 | 0 | 1 | 0 | 1 | | 3.4 | 0 | 1 | 1 | 1 | 1 |
| 0 | 0 | 0 | 1 | 0 | 1 | 1 | 0 | | 4 | 1 | 0 | 0 | 0 | 0 |
| 0 | 0 | 0 | 1 | 0 | 1 | 1 | 1 | | 4.7 | 1 | 0 | 0 | 0 | 1 |
| 0 | 0 | 0 | 1 | 1 | 0 | 0 | 0 | | 5.6 | 1 | 0 | 0 | 1 | 0 |
| 0 | 0 | 0 | 1 | 1 | 0 | 0 | 1 | | 6.7 | 1 | 0 | 0 | 1 | 1 |
| 0 | 0 | 0 | 1 | 1 | 0 | 1 | 0 | | 8 | 1 | 0 | 1 | 0 | 0 |
| 0 | 0 | 0 | 1 | 1 | 0 | 1 | 1 | | 9.5 | 1 | 0 | 1 | 0 | 1 |
| 0 | 0 | 0 | 1 | 1 | 1 | 0 | 0 | | 11 | 1 | 0 | 1 | 1 | 0 |
| 0 | 0 | 0 | 1 | 1 | 1 | 0 | 1 | | 13 | 1 | 0 | 1 | 1 | 1 |
| 0 | 0 | 0 | 1 | 1 | 1 | 1 | 0 | | 16 | 1 | 1 | 0 | 0 | 0 |
| 0 | 0 | 0 | 1 | 1 | 1 | 1 | 1 | | ∞ m | 1 | 1 | 1 | 1 | 1 |
| 0 | 0 | 1 | 0 | 0 | 0 | 0 | 0 | Focal | 50 mm | 0 | 0 | 1 | 0 | 1 |
| 0 | 0 | 1 | 0 | 0 | 0 | 0 | 1 | Length | 50 | 0 | 0 | 1 | 1 | 0 |
| 0 | 0 | 1 | 0 | 0 | 0 | 1 | 0 | | 50 | 0 | 0 | 1 | 1 | 1 |
| 0 | 0 | 1 | 0 | 0 | 0 | 1 | 1 | | 70 | 0 | 1 | 0 | 0 | 0 |
| 0 | 0 | 1 | 0 | 0 | 1 | 0 | 0 | | 75 | 0 | 1 | 0 | 0 | 1 |
| 0 | 0 | 1 | 0 | 0 | 1 | 0 | 1 | | 75 | 0 | 1 | 0 | 1 | 0 |
| 0 | 0 | 1 | 0 | 0 | 1 | 1 | 0 | | 85 | 0 | 1 | 0 | 1 | 1 |
| 0 | 0 | 1 | 0 | 0 | 1 | 1 | 1 | | 85 | 0 | 1 | 1 | 0 | 0 |
| 0 | 0 | 1 | 0 | 1 | 0 | 0 | 0 | | 100 | 0 | 1 | 1 | 0 | 1 |
| 0 | 0 | 1 | 0 | 1 | 0 | 0 | 1 | | 100 | 0 | 1 | 1 | 1 | 0 |
| 0 | 0 | 1 | 0 | 1 | 0 | 1 | 0 | | 105 | 0 | 1 | 1 | 1 | 1 |
| 0 | 0 | 1 | 0 | 1 | 0 | 1 | 1 | | 105 | 1 | 0 | 0 | 0 | 0 |
| 0 | 0 | 1 | 0 | 1 | 1 | 0 | 0 | | 105 | 1 | 0 | 0 | 0 | 1 |
| 0 | 0 | 1 | 0 | 1 | 1 | 0 | 1 | | 135 | 1 | 0 | 0 | 0 | 1 |
| 0 | 0 | 1 | 0 | 1 | 1 | 1 | 0 | | 135 | 1 | 0 | 0 | 0 | 1 |
| 0 | 0 | 1 | 0 | 1 | 1 | 1 | 1 | | 135 mm | 1 | 0 | 0 | 0 | 1 |

Note *"fw" stands for minimum focal length when lens is zoomed to widest.
Note **"ft" stands for maximum focal length when lens is zoomed to most telescopic side.

TABLE 4

| Data in ROM $b_4 b_3 b_2 b_1 b_0$ | Aperture value F No. | Av | Focusing Distance m | Dv | Focal Length mm | dAvo |
|---|---|---|---|---|---|---|
| 0 0 0 0 0 | 1 | 0 | 0.25 | −4 | 6 | 0 |
| 0 0 0 0 1 | 1.2 | 0.5 | 0.30 | −3.5 | 7.5 | ⅛ |
| 0 0 0 1 0 | 1.4 | 1 | 0.35 | −3 | 8 | 2/8 |
| 0 0 0 1 1 | 1.7 | 1.5 | 0.42 | −2.5 | 16 | ⅜ |
| 0 0 1 0 0 | 2 | 2 | 0.5 | −2 | 17 | |
| 0 0 1 0 1 | 2.4 | 2.5 | 0.6 | −1.5 | 20 | |
| 0 0 1 1 0 | 2.8 | 3 | 0.7 | −1 | 24 | |
| 0 0 1 1 1 | 3.4 | 3.5 | 0.84 | −0.5 | 25 | |
| 0 1 0 0 0 | 4 | 4 | 1 | 0 | 28 | |
| 0 1 0 0 1 | 4.7 | 4.5 | 1.2 | 0.5 | 35 | |
| 0 1 0 1 0 | 5.6 | 5 | 1.4 | 1 | 45 | |
| 0 1 0 1 1 | 6.7 | 5.5 | 1.7 | 1.5 | 50 | |
| 0 1 1 0 0 | 8 | 6 | 2 | 2 | 70 | |
| 0 1 1 0 1 | 9.5 | 6.5 | 2.4 | 2.5 | 75 | |
| 0 1 1 1 0 | 11 | 7 | 2.8 | 3 | 85 | |
| 0 1 1 1 1 | 13 | 7.5 | 3.4 | 3.5 | 100 | |
| 1 0 0 0 0 | 16 | 8 | 4 | 4 | 105 | |
| 1 0 0 0 1 | 19 | 8.5 | 4.7 | 4.5 | 135 | |
| 1 0 0 1 0 | 22 | 9 | 5.6 | 5 | 150 | |
| 1 0 0 1 1 | 27 | 9.5 | 6.7 | 5.5 | 180 | |
| 1 0 1 0 0 | 32 | 10 | 8 | 6 | 200 | |
| 1 0 1 0 1 | 38 | 10.5 | 9.5 | 6.5 | 210 | |
| 1 0 1 1 0 | 45 | 11 | 11 | 7 | 250 | |
| 1 0 1 1 1 | | | 13 | 7.5 | 300 | |
| 1 1 0 0 0 | | | 16 | 8 | 400 | |
| 1 1 0 0 1 | | | 19 | 8.5 | 500 | |
| 1 1 0 1 0 | | | 22 | 9 | 600 | |
| 1 1 0 1 1 | | | 27 | 9.5 | 800 | |
| 1 1 1 0 0 | (Code for check) | | 32 | 10 | 1000 | |
| 1 1 1 0 1 | | | 38 | 10.5 | 1200 | |
| 1 1 1 1 0 | | | 45 | 11 | 1600 | |
| 1 1 1 1 1 | | | ∞ | | Fixed | |

The description is now directed to the data stored in ROM RO1 with reference to the above given Tables 3 and 4. It is to be noted that the data in Table 3 under a column "Data Example in ROM" are given as an example, and such data are for a zoom lens having a range of focal length between 50 mm and 135 mm, and a range of aperture size between F3.5 and F22. At a location specified by an address "00000001", data "11100" necessary for checking whether the lens is properly mounted or not is stored. The data "11100" is stored at the address "00000001" not only in the case of above given zoom lens, but also in any other types of lenses. Also, the data for checking is not necessarily "11100", but can be any other combination of 5-bit data, so long as such data is common to all other types of lenses.

In the location specified by the address "00000010", a data Av'o, representing approximate maximum aperture size, is stored. Since the approximate maximum aperture size Av'o for the exemplary zoom lens is F3.5 (=3.61 Av), a data "00111" corresponding to F3.4 (=3.5 Av), as shown in Table 4, is stored. In the address "00000011", data Avm representing the minimum aperture size is stored, and in the exemplary case, Avm is F22 (=9 Av). Thus, a data "10010" representing F22 as indicated in Table 4, is stored in the address "00000011". In the address "00000100", a data dAvo, representing a difference between the actual and approximate maximum aperture sizes, is stored, and in the exemplary case, it is 0.11 Av, which can be estimated to ⅛. Thus, a data "00001" representing dAvo =⅛, as indicated in Table 4, is stored in the address "00000100". Now, the values of Av'o and dAvo for the nonstandard type lens are given in Table 5 below. For the standard type lens, data Avo of true maximum aperture size is stored in the address "00000010", instead of the data Av'o of approximate maximum aperture size.

TABLE 5

| Max. Aperture size | | Data Av of Max. Aperture size | | | Data dAvo of difference between Avo and Av'o | | True Difference |
|---|---|---|---|---|---|---|---|
| F No. | Avo | Data | Av'o | F No. | Data | dAvo | |
| 1.8 | 1.696 | 00011 | 1.531 | 1.7 | 00001 | ⅛ | 0.165 |
| 2.5 | 2.644 | 00101 | 2.526 | 2.4 | 00001 | ⅛ | 0.118 |
| 3.5 | 3.615 | 00111 | 3.531 | 3.4 | 00001 | ⅛ | 0.083 |
| 3.6 | 3.696 | 00111 | 3.531 | 3.4 | 00001 | ⅛ | 0.165 |
| 4.5 | 4.340 | 01000 | 4 | 4 | 00011 | ⅜ | 0.340 |
| 5 | 4.644 | 01001 | 4.465 | 4.7 | 00001 | ⅛ | 0.179 |
| 6.3 | 5.311 | 01010 | 5 | 5.656 | 00010 | 2/8 | 0.311 |
| 6.5 | 5.401 | 01010 | 5 | 5.656 | 00011 | ⅜ | 0.401 |

In the address "00000101", a data fw, representing the minimum focal length of the zoom lens, is stored, and in the exemplary case, the actually stored data is "01011" representing the focal length 50 mm, as understood from the Table 4. In the address "00000110", a data ft, representing the maximum focal length of the zoom lens, is stored, and in the exemplary case, the stored data is "10001" representing the focal length 135 mm, as understood from the Table 4. In the case where the interchangeable lens is not a zoom lens, i.e., a lens with a fixed focal length, a data indicating such a fixed focal length is stored in the address "00000101", and a data "11111" indicating that the interchangeable lens has a fixed focal length is stored in the address "00000110". The above data are the fixed data for the lens.

In the addresses "00010000" through "00011111", data of various focusing distances are stored as variable data. From the focusing distance data producing device DS, a 4-bit data corresponding to the shifted amount of the distance ring (not shown) from the infinite-focusing position is produced; and the produced 4-bit data is applied through a data selector MP2 to four least significant inputs r3, r2, r1 and r0 of the ROM RO1 for designating a particular location therein, thereby a data of focusing distance in absolute value stored in the designated location is read out from the ROM RO1. According to the example given in Table 3, if the data produced from the focusing distance data producing device DS is "0010", an address "00010010" defined by the data "0010" designates a particular location in the ROM RO1, whereby the ROM RO1 produces a data "01100" representing the focusing distance of 2 m (Dv=2). If the data produced from the device DS is "1011", an address "00011011" defined by the data "1011" is produced, designating a particular location in the ROM RO1, whereby the ROM RO1 produces a data "10101" representing the focusing distance of 9.5 m (Dv=6.5). It is to be noted that, since the focusing distance data is used for the flash-photographing calculation and, therefore, the data is given by the APEX numbering system, the produced data corresponds to a value $2^{\frac{1}{2}Dv}$ m wherein Dv changes with a rate of ½. In contrast to this, it is possible to increase the range of data with a more precise rate of change by increasing the number of bits in the address data from the focusing distance data producing device DS and, at the same time, increasing the number of bits in the ROM RO1.

In the addresses "00100000" through "00101111", data of various focal lengths are stored for the case of zoom lens, and fixed data of "11111" is stored for the case of fixed focal length lens in each of said addresses. In a similar manner to the focusing distance, a 4-bit data corresponding to the shifted amount of zoom ring (not shown) from the minimum focal length is produced from the focal length data producing device FS; and the produced 4-bit data is applied through a data selector MP2 to four least significant inputs r3, r2, r1 and r0 of the ROM RO1 for designating a particular location therein, thereby a data of focal length in absolute value stored in the designated location is read out from the ROM RO1. According to the example given in Table 3, if the data produced from the focal length data producing device FS is "0010", an address "00100010" defined by the data "0010" designates a particular location in the ROM RO1, whereby the ROM RO1 produces a data "01011" representing the focal length of 50 mm. If the data produced from the device FS is "1010", an address "00101010" defined by the data "1010" is produced, designating a particular location in the ROM RO1, whereby the ROM RO1 produces a data "10000" representing the focal length of 105 mm. It is to be noted that, in the example shown in Table 3, the ROM RO1 is stored with various data of popular focal lengths, such as 50 mm, 85 mm, 100 mm, and so on; that is, focal lengths of fixed focal length lenses are available. In contrast to this, it is possible to obtain data of further precise focal lengths by increasing the number of bits in the address data and the focal length data.

Referring next to FIG. 7a and 7b, the description is directed to the interface circuit IF. When the microcomputer 1 produces from its output O2 a "HIGH" (waveform 02 shown in FIG. 9) as a start signal for starting the data reading, the positive edge of this start signal actuates the one-shot circuit OS1, whereby the one-shot circuit OS1 produces a positive going pulse (waveform OS1 shown in FIG. 9). By the negative edge of this pulse, a flip-flop FF1 is turned to set condition. The flip-flop FF1 is turned to a reset condition by a negative edge of a pulse from an OR gate OR1 which receives a pulse PR2 from the power-on-reset circuit P02 (FIG. 1) or a pulse end2 from an AND gate AN17 indicating the completion of data reading of the interface circuit IF, as will be described in detail later. The Q output of the flip-flop FF1 is connected to one input of AND gate AN1 and D input of D flip-flop DF1. The other input of the AND gate AN1 is connected to oscillator OSC shown in FIG. 1 for receiving a train of clock pulses CP. The output CPL of the AND gate AN1 is connected to clock terminal CL of the D flip-flop DF1 and also to a terminal JB2, and further to a terminal JL2, when the lens LE is mounted, for supplying clock pulses CPL to the lens LE. Therefore, the D flip-flop DF1 accepts D input and produces "HIGH" (waveform DF1 in FIG. 9) from its Q output by the negative edge of a clock pulse CPL which is produced immediately after the setting of the flip-flop FF1. The Q output of the D flip-flop DF1 is connected to reset terminal of each of counters CO1, CO2 and CO3 and also to enable terminal of each of decoders DE2 and DE3, thereby releasing the reset condition of the counters CO1, CO2 and CO3 and turning the decoders DE2 and DE3 in a condition ready to produce a signal, by the "HIGH" from the Q output of the D flip-flop DF1. In other words, by the "HIGH" from the Q output of the D flip-flop DF1, it is ready to carry out the data transmission between the interface circuit IF and the lens. The output of the OR gate OR1 is also connected a reset terminal of each of flip-flop FF3 and D flip-flops DF1, whereby the flip-flop FF3 is turned to a reset condition by the positive edge of the pulse from the OR gate OR1 and the D flip-flop DF1 is turned to a reset condition by the negative edge of the pulse from the OR gate OR1.

Referring now to FIG. 8, when the micro-computer 1 produces "HIGH" from its output O2, the transistor BT2 (FIG. 1) is turned on for supplying power from the camera body to the lens through the terminals JB1 and JL1. Accordingly, a power-on-reset circuit PO3 is so actuated as to produce a pulse from its output. The output of the power-on-reset circuit PO3 is connected to each of flip-flops FF7 and FF5 and D flip-flop DF5. Thus, by the positive edge of the pulse from the power-on-reset circuit PO3, the flip-flop FF7 and D flip-flop DF5 are turned to reset condition, and by the negative edge of the pulse from the power-on-reset circuit PO3, the flip-flop FF5 is turned to set condition. Thereafter, by the negative edge of a clock pulse CPL, which is transmitted from the AND gate AN1 (FIG. 7a) through the terminals JB2 and JL2, the D flip-flop DF5 takes in a "HIGH" from the Q output of the flip-flop FF5 and, thus, the Q output of the D flip-flop DF5 produces "HIGH". The Q output of the D flip-flop DF5 is connected to reset terminal of counters CO4 and CO5 and also to enable terminal of a decoder DE4, whereby the "HIGH" from the Q output of the D flip-flop DF5 releases the reset condition of the counters CO4 and CO5 and, at the same time, turns the decoder DE4 to a condition ready to produce an output.

It is to be noted that by making the pulse width of the "HIGH" pulse from the one-shot-circuit OS1 wider than that from the power-on-reset PO3, the flip-flop FF1 shown in FIG. 7a will be turned to a set condition after the flip-flop FF5 shown in FIG. 8 is turned to a set condition. By the set condition of the flip-flop FF1, the AND gate AN1 produces a train of clock pulses and, therefore, by the negative edge of the first clock pulse CPL from the AND gate AN1, the D flip-flops DF1 and DF5 positively produce "HIGH" from their Q output, thereby the circuits in the camera body and those in the lens are released from the reset condition simultaneously.

The counter CO1 and decoder DE2 shown in FIG. 7a and the counter CO4 and decoder DE4 shown in FIG. 8 are provided for producing timing signals which synchronize the circuit operations between the circuits in the camera and the lens. The counter CO1 is a 4-bit counter capable of counting 16 pulses, and it counts clock pulses CP. The counter CO4 is also a 4-bit counter, and it counts clock pulses CPL. The decoder DE2 has 3 inputs for receiving 3-bit signal from the least significant digit outputs CB2, CB1 and CB0 of the counter CO1 and, by the combination of 3-bit signal, the decoder DE2 produces a "HIGH" from one of its outputs TB7 to TB0. Similarly, the decoder DE4 has 3 inputs for receiving 3-bit signal from the least significant digit outputs CL2, CL1 and CL0 of the counter CO4 and, by the combination of 3-bit signal, the decoder DE4 produces a "HIGH" from one of its outputs TL7 to TL0. The waveforms of pulse signals from the outputs TB7 to TB0, which are identical to the pulse signals from the outputs TL7 to TL0, respectively, are shown in FIGS. 9 and 10. Also, the relationship between the combination of 3-bit signal from the counter CO1 (or CO4) and the output signal produced from the decoder DE2 (or DE4) is shown in Table 6 below.

TABLE 6

| Counter CO1 (C04) | | | Decoder DE2 (DE4) | | | | | | | |
|---|---|---|---|---|---|---|---|---|---|---|
| CB2 or CL2 | CB1 or CL1 | CB0 or CL0 | TB0 or TL0 | TB1 or TL1 | TB2 or TL2 | TB3 or TL3 | TB4 or TL4 | TB5 or TL5 | TB6 or TL6 | TB7 or TL7 |
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

The counter CO2 shown in FIG. 7a is a 3-bit counter for counting pulses produced from output CB3 of the counter CO1, and has three outputs CS2, CS1 and CS0, which are connected to inputs of the decoder DE3, as well as the output CB3 of the counter CO1. By the combination of 4-bit signal (CB3, CS2, CS1 and CS0), the decoder DE3 produces a "HIGH" from one of its outputs S14 to S0. The "HIGH" signal produced from the decoder DE3 is used for determining a transmitting address data from the interface circuit IF to the lens and the steps for reading data from the lens. From this view point, a period in which the terminal S1 is producing "HIGH" is referred to as a period S1, and, in general terms, a period in which a terminal Sn (n is an integer between 1 and 14) is producing "HIGH" is referred to as a period Sn.

The relationship between the combination of 4-bit signal applied to the decoder DE3 and the output signals produced from the decoder DE3 is shown in Table 7 below.

TABLE 7

| Input | | | | Decoder DE3 Output | | | | | | | | | | | | | | |
|---|---|---|---|---|---|---|---|---|---|---|---|---|---|---|---|---|---|---|
| CB3 | CS2 | CS1 | CS0 | S0 | S1 | S2 | S3 | S4 | S5 | S6 | S7 | S8 | S9 | S10 | S11 | S12 | S13 | S14 |
| 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 1 | 1 | 0 | 0 | 0 | 0 | 0 | 0 | 0 | 0 | 0 | 0 | 0 | 0 | 0 | 0 |
| 0 | 0 | 1 | 0 | 0 | 1 | 0 | 0 | 0 | 0 | 0 | 0 | 0 | 0 | 0 | 0 | 0 | 0 | 0 |
| 0 | 0 | 1 | 1 | 0 | 0 | 1 | 0 | 0 | 0 | 0 | 0 | 0 | 0 | 0 | 0 | 0 | 0 | 0 |
| 0 | 1 | 0 | 0 | 0 | 0 | 0 | 1 | 0 | 0 | 0 | 0 | 0 | 0 | 0 | 0 | 0 | 0 | 0 |
| 0 | 1 | 0 | 1 | 0 | 0 | 0 | 0 | 1 | 0 | 0 | 0 | 0 | 0 | 0 | 0 | 0 | 0 | 0 |
| 0 | 1 | 1 | 0 | 0 | 0 | 0 | 0 | 0 | 1 | 0 | 0 | 0 | 0 | 0 | 0 | 0 | 0 | 0 |
| 0 | 1 | 1 | 1 | 0 | 0 | 0 | 0 | 0 | 0 | 1 | 0 | 0 | 0 | 0 | 0 | 0 | 0 | 0 |
| 1 | 0 | 0 | 0 | 0 | 0 | 0 | 0 | 0 | 0 | 0 | 1 | 0 | 0 | 0 | 0 | 0 | 0 | 0 |
| 1 | 0 | 0 | 1 | 0 | 0 | 0 | 0 | 0 | 0 | 0 | 0 | 1 | 0 | 0 | 0 | 0 | 0 | 0 |
| 1 | 0 | 1 | 0 | 0 | 0 | 0 | 0 | 0 | 0 | 0 | 0 | 0 | 1 | 0 | 0 | 0 | 0 | 0 |
| 1 | 0 | 1 | 1 | 0 | 0 | 0 | 0 | 0 | 0 | 0 | 0 | 0 | 0 | 1 | 0 | 0 | 0 | 0 |
| 1 | 1 | 0 | 0 | 0 | 0 | 0 | 0 | 0 | 0 | 0 | 0 | 0 | 0 | 0 | 1 | 0 | 0 | 0 |
| 1 | 1 | 0 | 1 | 0 | 0 | 0 | 0 | 0 | 0 | 0 | 0 | 0 | 0 | 0 | 0 | 1 | 0 | 0 |
| 1 | 1 | 1 | 0 | 0 | 0 | 0 | 0 | 0 | 0 | 0 | 0 | 0 | 0 | 0 | 0 | 0 | 1 | 0 |
| 1 | 1 | 1 | 1 | 0 | 0 | 0 | 0 | 0 | 0 | 0 | 0 | 0 | 0 | 0 | 0 | 0 | 0 | 1 |

Referring to FIG. 7a, one input of the AND gate AN7 is connected to the terminal TB6 of the decoder DE2, and the other input thereof is connected to the terminal CB3 of the counter CO1 through an inverter IN0. The output of the AND gate AN7 is connected to a clock terminal CL of the counter CO3. The counter CO3 is a 3-bit counter for providing data necessary for defining address data for the ROM RO1 provided in the lens, and has 3 outputs which are connected to inputs Ba3, Ba2 and Ba1 of a shift register SR1. The counter CO3 counts pulses from the output TB6 of the decoder DE2 while the output CB3 of the counter CO1 is producing "LOW". Thus, when the output TB6 of the decoder DE2 produces "HIGH" during the period S0, the counter CO3 produces a 3-bit signal "001". Likewise, when the output TB6 produces "HIGH" during the period S2, the counter CO3 produces a 3-bit signal "010"; when the output TB6 produces "HIGH" during the period S4, the counter CO3 produces a 3-bit signal "011"; when the output TB6 produces "HIGH" during the period S6, the counter CO3 produces a 3-bit signal "100"; when the output TB6 produces "HIGH" during the period S8, the counter CO3 produces a 3-bit signal "101"; and when the output TB6 produces "HIGH" during the period S10, the counter CO3 produces a 3-bit signal "110".

The shift register SR1 shown in FIG. 7a is an 8-bit shift register having 8 inputs Ba0 to Ba7. The inputs Ba3, Ba2 and Ba1 are connected to the counter CO3 as described above, and the remaining inputs Ba7, Ba6, Ba5, Ba4 and Ba0 are connected to ground. While the switching terminal SP of the shift register SR1 is receiving "HIGH", and when the positive edge of a clock pulse CP is applied to the clock terminal CL, the shift register SR1 simultaneously and parallelly stores an 8-bit signal applied to its 8 inputs Ba7 to Ba0. Contrary, while the switching terminal SP of the shift register SR1 is receiving "LOW", the positive edges of the clock pulses CP sequentially send out the stored 8-bit signal bit-by-bit from the most significant bit serially through the output terminal.

One input of an AND gate AN2 is connected to the output TB6, and one input of an AND gate AN3 is connected to the output TB7. The other inputs of the AND gates AN2 and AN3 are connected to the pulse generator for receiving clock pulses CP. The output of the AND gate An2 is connected to a set terminal of a flip-flop FF2, and the output of the AND gate AN3 is connected to a reset terminal of the flip-flop FF2. A Q output of the flip-flop FF2 is connected to the switching terminal SP of the shift register SR1. Therefore, the flip-flop FF2 is turned to a set condition by the negative edge of a clock pulse CP produced while the terminal TB6 is "HIGH", and is turned to a reset condition by the negative edge of a clock pulse CP produced while the terminal TB7 is "HIGH" (See waveforms FF2 shown in FIGS. 9 and 10.). Accordingly, the shift register SR1 stores the 8-bit signal by the positive edge of the "HIGH" from the terminal TB7, and sequentially sends out the stored 8-bit signal by the sequential "HIGH" signals from the terminals TB0 and TB6.

Referring to FIG. 7a, a set terminal of a flip-flop FF3 is connected to an output of AND gate AN15 (FIG. 7b) for receiving a signal end1. The AND gate AN15 has one input connected to the terminal TB6 of the decoder DE2 and the other input connected to the terminal S12 of the decoder DE3. Therefore, during a period S12 and when the terminal TB6 produces a pulse, the signal end1 is produced from the AND gate AN15 and is applied to the set terminal of the flip-flop FF3. The signal end1 is produced when the reading of fixed data from the lens is completed. Therefore, after the signal end1, it is necessary to produce any address data from the interface circuit IF. Thus, when the flip-flop FF3 is turned to a set condition by the signal end1, it produces "LOW" from its $\overline{Q}$ terminal, whereby an AND gate AN4, having its one input connected to the $\overline{Q}$ terminal, produces "LOW" to turn a switching circuit SC1 off. The other input of the AND gate AN4 is connected to the output CB3 of the counter CO1. Thus, the AND gate AN4 produces "HIGH" when the terminal CB3 of the counter CO1 produces "HIGH" during the $\overline{Q}$ terminal of the flip-flop FF3 is producing "HIGH", i.e., during a period from the generation of "HIGH" from the OR gate OR1 until the generation of the signal end1. When the AND gate AN4 produces "HIGH", the switching circuit SC1 is turned on to transmit address data produced from the shift register SR1 to the lens through the terminals JB3 and JL3.

An OR gate OR3 has two inputs: one input is connected to the Q terminal of the flip-flop FF3; and the other input is connected to the terminal CB3 of the counter CO1 through an inverter IN6. The output of the OR gate OR3 is connected to a control terminal of a switching circuit SC2 and also to one input of an AND gate AN5. The other input of the AND gate AN5 is connected to the terminal TB5 of the decoder DE2, and the output of the AND gate AN5 is connected to a latch terminal L of a latch circuit LA. The switching circuit SC2 is connected between the terminal JB3 and an IN terminal of a shift register SR2. The shift register SR2 sequentially stores the signal applied at its IN terminal in synchronized relation with the negative edge of the clock pulse CP, and produces the stored signal from its outputs Bb0 to Bb4. Thus, the OR gate OR3 produces "HIGH" when the output CB3 of the counter CO1 produces "LOW" and when the flip-flop FF3 is in reset condition producing "HIGH" from its Q output (a period from the start of data reading in the lens until the end of fixed data reading of all the data in the lens). And, when the OR gate OR3 is producing "HIGH", the switching circuit SC2 is turned on to transmit signals from the terminal JB3 to the shift register SR2.

As apparent from the above, the switching circuits SC1 and SC2 are turned on alternately, thus preventing the simultaneous turn on of the switching circuits SC1 and SC2. In this manner, the address data produced from the shift register SR1 is transmitted through the switching circuit SC1 and terminals JB3 and JL3 to the lens when the switching circuit SC1 is turned on, and the lens data from the lens is transmitted through the terminals JL3 and JB3 and the switching circuit SC2 to the shift register SR2 when the switching circuit SC2 is turned on, thereby preventing any interference between the address data and lens data. The outputs Bb4 to Bb0 of the shift register SR2 are connected to a latch circuit LA, so that the latch circuit LA latches the data at the outputs Bb4 to Bb0 in response to the positive edge of a pulse from the terminal TB5 when the OR gate OR3 is producing "HIGH".

Referring to FIG. 7b, the output of the latch LA is connected to each of registers REG0 to REG7. The registers REG0 to REG7, each having a latch terminal L, are connected to AND gates AN10 to AN17, at respective latch terminals L. One of the inputs of AND gates AN10 to AN17 are connected to each other and further to the terminal TB6 of the decoder DE2, and other of the inputs thereof are connected to terminals S2, S4, S6, S8, S10, S12, S13 and S14 of the decoder DE3, respectively. The output of the AND gate AN17 produces an end2 signal indicating that reading and storing of all data from the lens are completed. The output of the AND gate AN17 is connected not only to the latch terminal L of the register REG7 but also to a set terminal S of a flip-flop FF4 (FIG. 7a). The Q terminal of the flip-flop FF4 is connected to the input i3 of the micro-computer 1 (FIG. 1), and the reset terminal R thereof is connected to an OR gate OR2. The OR gate OR2 has two inputs: one is connected to the output PR2 of the power-on-reset PO2 (FIG. 1); and the other is connected to output a7 of a decoder DE1, which will be described below. Therefore, the flip-flop FF4 is turned to reset condition when the power-on-reset circuit PO2 produces a pulse from its output PR2 in response to the turn on of the light measuring switch MS, and is turned to set condition when the AND gate AN17 produces the signal end2 upon completion of data reading and storing from the lens. The output a7 of the decoder DE1, as will be described below, produces "HIGH" at the end of data transmission from the interface circuit IF to the micro-computer 1 and, therefore, the flip-flop FF4 is turned to the reset condition at the end of data transmission from the interface circuit IF to the micro-computer 1.

Referring to FIG. 7a, the decoder DE1 receives data from the output OP3 of the micro-computer 1 and produces a "HIGH" from one of its outputs a0 to a7 depending on the received data from the micro-computer 1. A relationship between the input data and output data of the decoder DE1 is shown below in Table 8.

TABLE 8

| Inputs (OP3 output) | | | | Decoder DE1 Outputs | | | | | | | |
|---|---|---|---|---|---|---|---|---|---|---|---|
| | | | | a0 | a1 | a2 | a3 | a4 | a5 | a6 | a7 |
| 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 |
| 0 | 0 | 1 | 0 | 0 | 0 | 0 | 0 | 0 | 0 | 0 | 0 |
| 0 | 0 | 1 | 1 | 0 | 0 | 0 | 0 | 0 | 0 | 0 | 0 |
| 0 | 1 | 0 | 0 | 0 | 0 | 0 | 0 | 0 | 0 | 0 | 0 |
| 0 | 1 | 0 | 1 | 1 | 0 | 0 | 0 | 0 | 0 | 0 | 0 |
| 0 | 1 | 1 | 0 | 0 | 1 | 0 | 0 | 0 | 0 | 0 | 0 |
| 0 | 1 | 1 | 1 | 0 | 0 | 1 | 0 | 0 | 0 | 0 | 0 |
| 1 | 0 | 0 | 0 | 0 | 0 | 0 | 1 | 0 | 0 | 0 | 0 |
| 1 | 0 | 0 | 1 | 0 | 0 | 0 | 0 | 1 | 0 | 0 | 0 |
| 1 | 0 | 1 | 0 | 0 | 0 | 0 | 0 | 0 | 1 | 0 | 0 |
| 1 | 0 | 1 | 1 | 0 | 0 | 0 | 0 | 0 | 0 | 1 | 0 |
| 1 | 1 | 0 | 0 | 0 | 0 | 0 | 0 | 0 | 0 | 0 | 1 |

The outputs a0 to a7 of the decoder DE1 are connected to chip select terminals CS of the registers REG0 to REG7, respectively. When the chip select terminal CS of a particular register receives "HIGH" from the decoder DE1, said particular register provides data stored therein to the input IP1 of the data selector MP1 and further to the micro-computer 1.

Referring to FIG. 8, an AND gate AN30 has two inputs: one is connected to the output CL3 of the counter CO4; and the other is connected to output $\overline{FD}$ of $\overline{Q}$ terminal of the flip-flop FF7. The output of the AND gate AN30 is connected to the switching circuit SC3, which is connected between the terminal JL3 and input of a shift register SR3. Furthermore, the clock input CL of the shift register SR3 is connected to the terminal JL2 for receiving a train of clock pulses CPL. Thus, while the switching circuit SC3 is on, the shift register SR3 sequentially stores the address data a from the camera body through the terminals JB3 and JL3 in response to the negative edge of the clock pulses, thereby producing an address data from its terminals La0 to La6.

The least significant 3-bit outputs La2, La1 and La0 of the shift register SR3 are connected to an AND gate AN31 such that the AND gate AN31 produces "HIGH" when the 3-bit outputs La2, La1 and La0 produce a signal "110", i.e., when the last address data for reading the fixed data has been transmitted from the camera body to the lens. The output of the AND gate AN31 is connected to one input of an AND gate AN35. The other input of the AND gate AN35 receives a train of clock pulses CPL. The output of the AND gate AN35 is connected a set terminal of a flip-flop FF7. Therefore, the flip-flop FF7 is turned to a set condition when the AND gate AN31 produces "HIGH" (i.e., when the last address for the fixed data is applied to the shift register SR3) with the terminal TL7 producing "HIGH". When the flip-flop FF7 is turned to the set condition, its output FD of Q terminal produces "HIGH" and its output $\overline{FD}$ of $\overline{Q}$ terminal produces "LOW". An AND gate AN32 has two inputs: one is connected to the output FD of Q terminal of the flip-flop FF7; and the other is connected to the terminal TL6 of the decoder DE4. The output of the AND gate AN32 is connected to a clock terminal CL of a counter CO5. Therefore, the outputs Ca1 and Ca0 of the counter CO5 produce a 2-bit signal "01" when the flip-flop FF7 produces "HIGH" from its output FD of the Q terminal and when the output TL6 produces "HIGH" during a period S12 in the next sequence. Furthermore, the outputs Ca1 and Ca0 of the counter CO5 produce a 2-bit signal "10" when the output TL6 produces "HIGH" during a period S13 in the next sequence.

The outputs Ca1 and Ca0 of the counter CO5 are connected to the data selector MP2 and, more particularly, to the data input portions d2 and d3 and also to selection terminal SL. The data input portion d1 of the data selector MP2 is connected to the outputs La0 to La6 of the shift register SR3. The data input portion d2 has its most significant bit terminal grounded, the second and third bit terminals from the most significant bit terminal are connected to the outputs Ca1 and Ca0 of the counter CO5, and the remaining 4 bit terminals are connected to the outputs of the focusing distance data producing device DS. The data input portion d3 has its most significant bit terminal grounded, the second and third bit terminals from the most significant bit terminal are connected to the outputs Ca1 and Ca0 of the counter CO5, and the remaining 4 bit terminals are connected to the outputs of the focal length data producing device FS.

When the selection terminal SL receives "00", the data selector MP2 produces data applied to its input portion d1. Similarly, when the selection terminal SL receives "01", the data selector MP2 produces data applied to its input portion d2, and when the selection terminal SL receives "11", the data selector MP2 produces data applied to its input portion d3. Therefore, until the terminal TL6 produces "HIGH" during a period S12, the data selector MP2 produces address data which has been transmitted from the camera body through the shift register SR3. And from that time above moment until the terminal TL6 produces "HIGH" during a period S13, the data selector MP2 produces address data concerning the focusing distance applied to the input portion d2, and thereafter, the data selector MP2 produces address data concerning the focal length applied to the input portion d3.

The 7 outputs of the data selector MP2 are connected to the lower 7 inputs r6 to r0 of he ROM RO1. The remaining input r7 of the ROM RO1 is connected to ground. As shown in Table 3, various data is stored in the ROM RO1 at various locations which can be specified by the addresses. Therefore, by the address data applied to the inputs r0 to r7 of the ROM RO1, data stored in a particular location is read out and produced as a 4-bit signal from the ROM RO1. The 4 outputs of the ROM RO1 are connected to 4 upper-bit inputs Lb4 to Lb7 of a shift register SR4. The remaining 3-inputs Lb2 to Lb0 of the shift register SR4 are grounded. The shift register SR4, AND gates AN33 and AN34, and flip-flop FF6 are arranged in the same manner as the above described shift register SR1, AND gates AN2 and AN3, and flip-flop FF2 shown in FIG. 7a. Thus, by the positive edge of a pulse from the terminal TL7, the shift register SR4 simultaneously stores the data applied to its inputs Lb7 to Lb0 and, thereafter, by the positive edge of clock pulses applied to the clock terminal CL, the stored data is sequentially sent out from its output bit-by-bit.

An OR gate OR5 has two inputs: one is connected to an output CL3 of a counter CO4 through an inverter IN10; and the other is connected to the output FD of the Q terminal of the flip-flop FF7. The output of the OR gate OR5 is connected to a control input of a switching circuit SC4, which is connected between the output of the shift register SR4 and the terminal JL3. By the arrangement of the OR gate OR5, switching circuit SC4, and by the arrangement of AND gate AN30 and switching circuit SC3, the switching circuits SC3 and SC4 turn on alternately. More specifically, the switching circuit SC3 turns on when the output FD of the Q terminal of flip-flop FF7 is "LOW" (i.e., when the fixed data of the lens is transmitted) and when the output CL3 of the counter CO4 produces "HIGH", thereby transmitting address data from the camera body to the shift register SR3 through the terminals JB3 and JL3. And, the switching circuit SC4 turns on when the output CL3 of the counter CO4 produces a "LOW", thereby transmitting the data read out from the ROM RO1 to the camera body through the same terminals JL3 and JB3. In this manner, address data and fixed data from the ROM is transmitted alternately through the same and single transmission line between the terminals JB3 and JL3. Thereafter, when the output FD of the Q terminal of flip-flop FF7 produces "HIGH", only the switching circuit SC4 is maintained turned on, thereby transmitting variable data, such as focusing distance data and focal length data, to the camera body through the same terminals JL3 and JB3.

Next, the description is directed to the operation of circuits of FIGS. 7a, 7b and 8 with reference to the time chart shown in FIGS. 9 and 10. When the output O2 of the micro-computer 1 produces "HIGH" (FIG. 9, waveform O2), the one-shot circuit OS1 produces a pulse (FIG. 9, waveform OS1) for turning the flip-flop FF1 to a set condition. Then, by the positive edge of a next clock pulse, the D flop-flop DF1 produces "HIGH" from its Q output, thereby releasing the reset condition of the counters CO1, CO2 and CO3 and, at the same time, setting the decoders DE2 and DE3 in a condition ready to produce an output. Furthermore, when the flip-flop FF1 is turned to the set condition, the AND gate AN1 produces clock pulses CPL (FIG. 9, waveform CPL), which is applied to the circuit of FIG. 8 provided in the lens through the terminals JB2 and JL2.

In the meantime, by the "HIGH" from the output O2 of the micro-computer 1, the power supply transistor BT2 conducts to supply electric power to the circuit of FIG. 8 through the terminals JB1 and JL1. When the terminal JL1 receives power, the power-on-reset circuit PO3 produces a pulse; and by the positive edge of this pulse, the flip-flop FF7 and D flip-flop DF5 are turned to the reset condition; and also by the negative edge of this pulse, the flip-flop FF5 is turned to the set condition. Then, by the positive edge of the first clock pulse CPL, the Q output of the D flip-flop DF5 produces a "HIGH", thereby releasing the reset condition of the counters CO4 and CO5 and, at the same time, putting the decoder DE4 in a condition ready for producing an output. This completes the initial preparation for the data transfer operation.

Next, referring particularly to FIG. 7a, when the terminal TB6 produces "HIGH" during a period S0, the counter CO3 produces a data "001" which is applied to the shift register SR1. Then, when the terminal TB7 produces "HIGH" immediately thereafter, the shift register SR1 stores the data "001", thus, the shift register SR1 is now holding an 8-bit data "00000010". Then, in the next period S1, the shift register SR1 sequentially sends out the data "00000010" bit-by-bit in response to the positive edges of the pulses from the terminals TB0 to TB7. Thus sent out data is transmitted serially through the switching circuit SC1, terminals JB3 and JL3 to the lens. During this moment, since the switching circuit SC3 in FIG. 8 is on, the data is sequentially stored in the shift register SR3 in response to the negative edges of the clock pulses CPL (FIG. 9, waveforms La0, La1 and La2). It is to be noted that the shift register SR1 sends out 8 bits of signal, but the shift register SR3 accommodates only 7 bits. Therefore, when the shift register SR3 stores the upper 7 bits "0000001" from the shift register SR1, the stored data "0000001" is transmitted through the data selector MP2 to the inputs r6 to r0 of the ROM RO1 as a part of address data (FIG. 9, waveforms SB, La0, La1 and La2), and, thereupon, the ROM RO1 receives 8-bit address data "00000001" to its inputs r7 to r0, thereby producing a data stored in the designated address "00000001". More specifically, by the negative edge of a clock pulse produced when the terminal TL6 is "HIGH" during the period S1, the shift register SR3 produces from its outputs La6 to La0 the data "0000001" (FIG. 9, waveforms La0, La1 and La2), thereby specifying a location in the ROM RO1 with an address "00000001". In the specified location in the ROM RO1, a data for check "11100", as shown in Table 3, is stored, and is produced from the ROM RO1. The data "11100" produced from the ROM RO1 is stored in the shift register SR4 in response to the positive edge of a pulse from the terminal TL7.

Then, in the next period S2 since the output CL3 of the counter CO4 produces "LOW" while the terminals TL0 to TL7 produce pulses, the data sequentially produced from the outputs Lb7 to Lb0 of the shift register SR4 in response to the positive edges of the pulses from the terminals TL0 to TL7 is serially transmitted through the switching circuit SC4, terminals JL3 and JB3 to the camera body (FIG. 9, waveform SB).

In FIG. 7, during the period S2 in which the data is transmitted from the lens to the camera body, the output CB3 of the counter CO1 is maintained "LOW", thereby turning on the switching circuit SC2. Thus, the data for check "11100" transmitted to the camera body through the terminals JL3 and JB3 is applied through the switching circuit SC2 and stored in the shift register SR2 in response to the negative edges of the clock pulses CP (FIG. 9, waveform Bb0 to Bb4). Then, by the negative edge of the clock pulse CP produced from the terminal TB4, the shift register SR2 produces "11100" (FIG. 9, waveforms Bb0 to Bb4). And by positive edge of the pulse produced from the AND gate AN5 in response to the pulse from the terminal TB5 (FIG. 9, waveform AN5), the data from the shift register SR2 is latched in the latch circuit LA. Then, by the pulse from the terminal TB6, the AND gate AN10 produces a pulse. By the positive edge of this pulse, the register REG0 stores the data from the latch circuit LA (FIG. 9, waveform AN10).

During the period S2, the AND gate AN7 produces a pulse in response to the pulse from the terminal TB6, thereby producing data "010" from the counter C03. Then, by the pulse produced from the terminal TB7, the shift register SR1 stores the data "010" from the counter C03. Thus, the shift register SR1 is now holding a data 00000010. Then, in the next period S3, the output CB3 of the counter CO1 produces "HIGH", thereby turning the switching circuit SC1 on and, furthermore, the output CL3 of the counter CO4, shown in FIG. 8, produces "HIGH", thereby turning the switching circuit SC3 on. As a consequence, the upper 7-bit data "0000010" from the shift register SR1 is transferred to the shift register SR3 (FIG. 8), in a similar manner as described above. The data "0000010" is further transferred through the data selector MP2 to the ROM RO1 at its terminals r6 to r0. Thus, the ROM RO1 receives an address data "00000010" to its inputs r7 to r0, thereby producing data of Av'o representing the approximate maximum aperture size. According to the example given in Table 3, the Av'o is 3.5 (F3.4) and, therefore, the data produced from the ROM RO1 is "00111". Then, by the positive edge of the pulse from the terminal TL7, the shift register SR4 stores the data "00111" produced from the ROM RO1.

During a period S4, the output CB3 of the counter CO1 and the output CL3 of the counter CO4 produces "LOW" and, therefore, the switching circuits SC2 and SC4 turn on to transfer the data "00111" stored in the shift register SR4 to the shift register SR2 in a similar manner described above. And, thereafter, by a pulse produced from the terminal TB5, the data "00111" in the shift register SR2 is latched in the latch circuit LA. And then, by a pulse produced from the terminal TB6, the AND gate AN11 produces a pulse (FIG. 9, waveform AN11), thereby the data "00111" representing the approximate maximum aperture size Av'o is stored in the register REG1.

In a similar manner, during a period S5, the address data "00000110" (which will be revised to "00000011" in later stage) is transmitted to the lens and, during a period S6, the Avm data representing the minimum aperture size, such as "10010" shown in Table 3, is transmitted from the ROM RO1 to the camera body and, in response to a pulse from the terminal TB6, the Avm data "10010" is stored in the register REG2.

During a period S7, the address data "00001000" (which will be revised to "00000100" in a later stage) is transmitted to the lens and, during a period S8, the dAvo data representing the difference between the actual and approximate maximum aperture size, such as "00001" shown in Table 3, is transmitted from the ROM RO1 to the camera body and, in response to a pulse from the terminal TB6, the dAvo data "00001" is stored in the register REG3.

During a period S9, the address data "00001010" (which will be revised to "00000101" in a later stage) is transmitted to the lens and, during a period S10, the fw data representing the minimum focal length, such as "01011" shown in Table 3, is transmitted from the ROM RO1 to the camera body and, in response to a pulse from the terminal TB6, the fw data "01011" is stored in the register REG4.

During a period S11, the address data "00001100" (which will be revised to "00000110" in a later stage) is transmitted to the lens and, during a period S12, the ft data representing the maximum focal length, such as "10001" shown in Table 3, is transmitted from the ROM RO1 to the camera body and, in response to a pulse from the terminal TB6, the ft data "10001" is stored in the register REG4. The above procedure completes the reading of fixed data from the lens.

During the period S11, by the negative edge of a clock pulse produced from the terminal TB6, the shift register SR3 produces from its outputs Laa, La1 and La0 a 3-bit signal "110" (FIG. 10 waveforms La0, La1 and La2). Then, by the positive edge of a clock pulse CPL produced from the AND gate AN35 in response to the pulse produced from the terminal TL7, the flip-flop FF7 is turned to a set condition, thereby producing a "HIGH" from the output FD of the Q terminal and a "LOW" from the output $\overline{FD}$ of $\overline{Q}$ terminal. Thereupon, the AND gate AN30 produces a "LOW" and the OR gate OR5 produces a "HIGH" regardless of the output from the terminal CL3 of the counter CO4 and, therefore, the switch circuit SC3 turns off and the switch circuit SC4 turns on, ready for sending various variant data from the lens to the camera body in a manner described below.

During a period S12 and when the terminal TL6 produces a "HIGH", the counter CO5 counts a pulse from the AND gate AN32 so as to produce "01" (FIG. 10, waveforms Ca0 and Ca1) from its output, thereby actuating the data selector MP2 to select data from the data input portion d2. Thus, the ROM RO1 receives data from the input portion d2. It is to be noted that, in this case, the lower 4-bit inputs r0, r1, r2 and r3 of the ROM RO1 receives data from the focusing distance data producing device DS, the intermediate 2-bit inputs r4 and r5 thereof receives data "01" from the outputs Ca0 and Ca1 of the counter CO5, and the upper 2-bit inputs r6 and r7 thereof receives data "00". Therefore, if the data from the focusing distance data producing device DS is "0000", the final address data applied to the ROM RO1 is "00010000". In this case, the ROM RO1 produces a focusing distance data Dv of "01010" indicating that the focusing distance is 1.4 m, as understood from Table 4. If the data from the device DS is "0001", the final address data applied to the ROM RO1 is "00010001". In this case, the ROM RO1 produces a Dv data "01011" indicating that the focusing distance is 1.7 m. Furthermore, if the data from the device DS is "1110", the final address data applied to the ROM RO1 is "00011110". In this case, the ROM RO1 produces a Dv data "11000" indicating that the focusing distance is 16 m, and, if the data from the device DS is "1111", the final address data applied to the ROM RO1 is "00011111". In this case, the ROM RO1 produces a Dv data "11111" indicating that the focusing distance is infinite.

The focusing distance data Dv produced from the ROM RO1 is stored in the shift register SR4 in response to a pulse produced from the terminal TL7, and by the positive edges of the clock pulses CP produced from the terminals TB0 to TB4 during a period S13 (FIG. 10, waveforms Bb0 to Bb4), the data Dv is stored in the shift register SR2 (FIG. 7a). And, thereafter, by a pulse from the terminal TB5, the data Dv is latched in the latch LA, and then, by a pulse from the terminal TB6, the AND gate AN16 produces a "HIGH" (FIG. 10, waveform AN16), thereby storing the data Dv in the register REG6.

In the step S14 and when the terminal TL6 produces "HIGH", the AND gate AN32 produces "HIGH", thereby producing "10" (FIG. 10, waveform Ca0 and Ca1) from the counter CO5. By the signal "10" from the outputs Ca0 and Ca1 of the counter CO5, the data selector MP2 selects data input portion d3. Thus, the ROM RO1 receives data from the input portion d3. It is to be noted that, in this case, the lower 4-bit inputs r0, r1, r2 and r3 of the ROM RO1 receive data from the focal length data producing device FS, the intermediate 2-bit inputs r4 and r5 thereof receives data "10" from the outputs Ca0 and Ca1 of the counter CO5, and the upper 2-bit inputs r6 and r7 thereof receives data "00". Therefore, if the data from the focal length data producing device FS is "0000", the final address data applied to the ROM RO1 is "00100000". In this case, the ROM RO1 produces a focal length data of "01011" indicating that the focal length is 50 mm, as understood from Table 4. If the data from the device FS is "1010", the final address data applied to the ROM RO1 is "00101010". In this case, the ROM RO1 produces a data "01111" indicating that the focal length is 105 mm. Furthermore, if the data from the device FS is "1111", the final address data applied to the ROM RO1 is "00101111". In this case, the ROM RO1 produces a data "10001" indicating that the focal length is 135 mm.

The focal length data produced from the ROM RO1 is stored in the shift register SR4 in response to a pulse produced from the terminal TL7 during the period S13 in a similar manner as described above, and by the positive edges of the clock pulses CP produced from the terminals TB0 to TB4 during a period S14 (FIG. 10, waveforms Bb0 to Bb4), the focal length data is stored in the shift register SR2 (FIG. 7a). And, thereafter, by a pulse from the terminal TB5, the focal length data is latched in the latch LA, and then, by a pulse from the terminal TB6, the AND gate AN17 produces a "HIGH" (FIG. 10 waveform An17), thereby storing the focal length data in the register REG7. At this moment, the "HIGH" produced from the AND gate AN17 serves as a signal end2 which is applied to the set terminal of the flip-flop FF4, thereby producing a "HIGH" from the Q output of the flip-flop FF4 (FIG. 10, waveforms AN17, end2 and FF4). The "HIGH" from the Q output of the flip-flop FF4 is applied to the input i3 of the micro-computer 1. Thus, the micro-computer 1 is informed that reading of all the data from the lens has been completed and that the read out data is temporarily stored in the interface circuit IF and, thereupon, it produces "LOW" from its output O2 for stopping the power supply to the lens.

Next, the micro-computer 1 starts to read data from the interface circuit IF through the data bus DB. First, when the data from the output OP3 of the micro-computer 1 is "5H", the output a0 of the decoder DE1 produces a "HIGH" and, therefore, the check data stored in the register REG0 is transmitted through the data selector MP1 and data bus DB to the micro-computer 1. Then, when the data from the output OP3 of the micro-computer 1 is "6H", the output a1 of the decoder DE1 produces "HIGH" and, therefore, the Av'o data stored in the register REG1 is transmitted to the micro-computer 1. Likewise, the various data stored in the other registers REG3 to REG7 is sequentially transmitted to the micro-computer 1. When all the data from the interface circuit IF has been transmitted to the micro-computer 1, the micro-computer 1 carries out the procedure described above in connection with FIGS. 6a, 6b and 6c.

The camera system according to the preferred embodiment of the invention as described above can be modified as follows. First of all, most of the control operations for controlling the aperture size and the shutter speed can be carried out in the micro-computer, and from this view point, many external parts can be eliminated. Secondly, it is possible to send the data already stored in the interface circuit IF parallel from the interface circuit IF to the micro-computer 1 during the reading and serial transmission of other data to the interface circuit IF. In this manner, the time for the data transmission from the lens to the micro-computer 1 can be shortened.

Furthermore, according to the flow chart shown in FIGS. 6a, 6b and 6c, the micro-computer 1 operates constantly and, therefore, it consumes electric power rather quickly. To prevent this, it is possible to reorganize the program so as to cut off the power when it is not necessary to run the micro-computer. Since such a reorganization of the program is not difficult to those skilled in the art, a further description therefor is omitted.

According to the preferred embodiment described above, the camera accessory can be any other than the above given example of interchangeable lens, such as a bellows, a reverse adaptor, a teleconverter, an extension ring, a strobo for emitting a flash-light, a motor drive device, a data back device, and others as long as such a camera accessory has a factor to be controlled.

It is to be noted that the shift register SR1 shown in FIG. 7a and the shift register SR4 shown in FIG. 8 operate such that by a positive edge of the pulse produced from the terminal TB7 (TL7), the data is parallelly stored in at once and, thereafter, by the positive edges of the pulses produced from the terminals TB0 to TB7 (TL0 to TL7), the stored data is sent out bit-by-bit serially from its output from the most significant bit. This type of shift-register can be formed as follows. First, 8 flip-flops are provided for parallelly receiving 8-bits of data at a time at respective preset terminals. A flip-flop which receives the least significant bit signal has its output connected to the input of a flip-flop which receives the second significant bit signal. The other flip-flops are connected in the same manner, and the flip-flop which receives the most significant bit signal is connected to an input of another (ninth) flip-flop. Thus, by a clock pulse applied to all the flip-flops, the signal preset in the Nth flip-flop (N is an integer between 1 and 8) is sent to the (N+1)th flip-flop. Therefore, by a train of clock pulses applied to all the flip-flops, the 8-bit signal is sequentially produced out bit-by-bit from the output of the 9th flip-flop with a delay of one clock pulse.

According to the present invention, a combination of the data Av'o and dAvo transmitted from the lens to the camera body can be replaced with other combinations of data, such as a combination of data Avo and dAvo, or a combination of data Avo and Av'o. The first modification described below employs the combination of data Avo and dAvo, and the second modification described below employs the combination of data Avo and Av'o.

In the case where the data Avo, representing the true and precise maximum aperture size, to be transmitted from the lens to the camera is expressed with the rate of ⅛Av, it is necessary to use at least a 7-bit long signal, as shown in Table 9 below.

TABLE 9

| Data | Av | Data | Av | Data | Av |
|------|-----|------|-----|------|-----|
| 00H | 0 | 10H | 2 | 38H | 7 |
| 01H | ⅛ | 14H | 2.5 | 3CH | 7.5 |
| 02H | 2/8 | 18H | 3 | 40H | 8 |
| 03H | ⅜ | 1CH | 3.5 | 44H | 8.5 |
| 04H | 4/8 | 20H | 4 | 48H | 9 |
| 05H | ⅝ | 24H | 4.5 | 4CH | 9.5 |
| 06H | 6/8 | 28H | 5 | 50H | 10 |
| 07H | ⅞ | 2CH | 5.5 | 54H | 10.5 |
| 08H | 1 | 30H | 6 | 58H | 11 |

TABLE 9-continued

| Data | Av | Data | Av | Data | Av |
|------|-----|------|-----|------|-----|
| 0CH | 1.5 | 34H | 6.5 | | |

In Table 9, Av values for the data "09H" to "0B", "0DH" to "0FH", "11H" to "13H", and so on, are not shown for the sake of brevity. To complete the table, Av values that increase with the rate of ⅛Av, as shown in data "00H" to "08H" should be provided in the missing data. Therefore, when the true maximum aperture size is F1.8, data "0DH" will be produced. Similarly, when the true maximum aperture size is F2.5, data "15H" will be produced; when the true maximum aperture size is F3.5, data "1DH" will be produced; when the true maximum aperture size is F3.6, also data "1DH" will be produced; when the true maximum aperture size is F4.5, data "23H" will be produced; when the true maximum aperture size is F5, data "25H" will be produced; when the true maximum aperture size is F6.3, data "2AH" will be produced; and when the true maximum aperture size is F6.5, data "2BH" will be produced.

Figure 11:
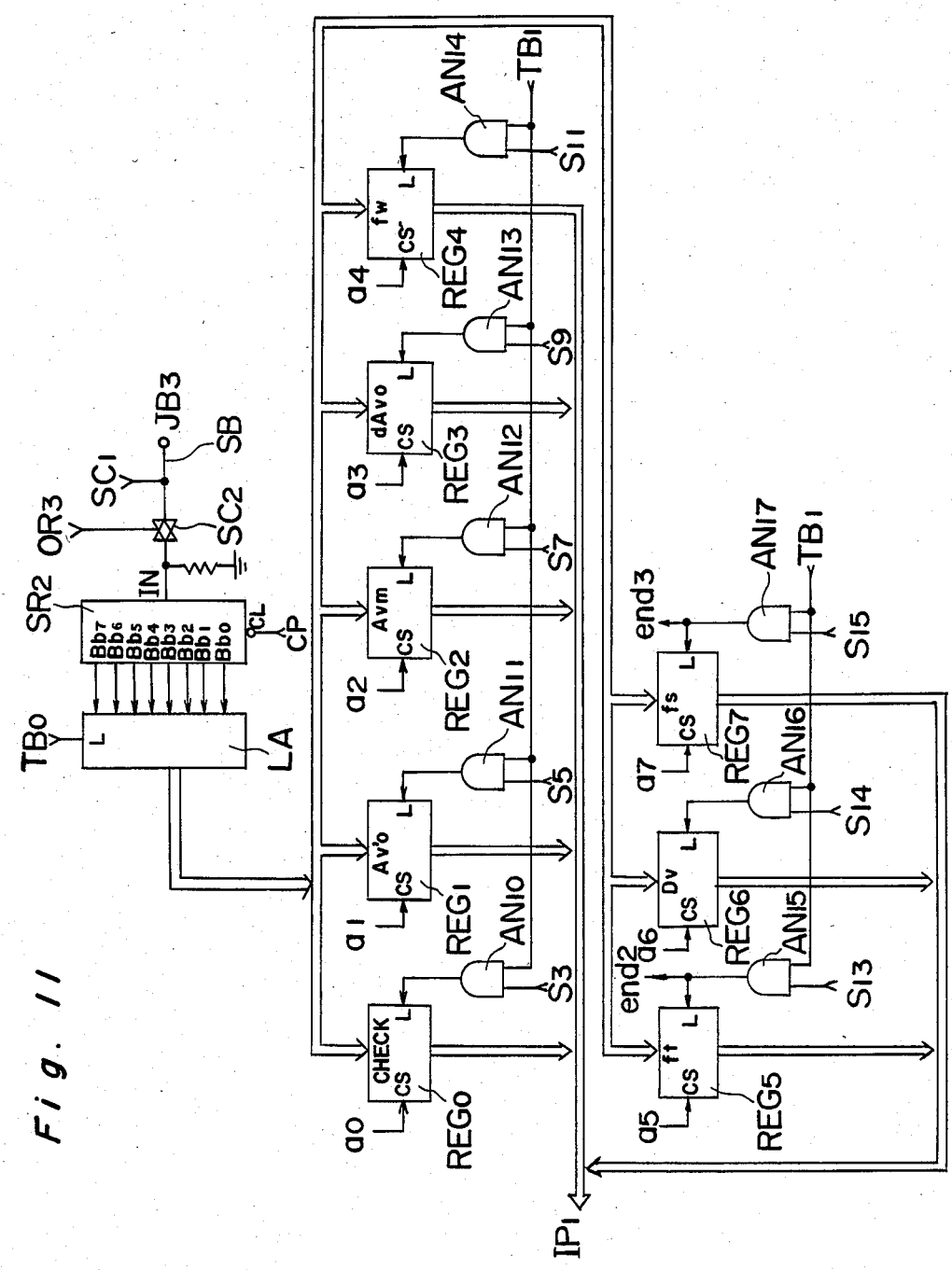
FIG. 11 is an altered form of the circuit shown in FIGS. 7a and 7b.
Figure 12:
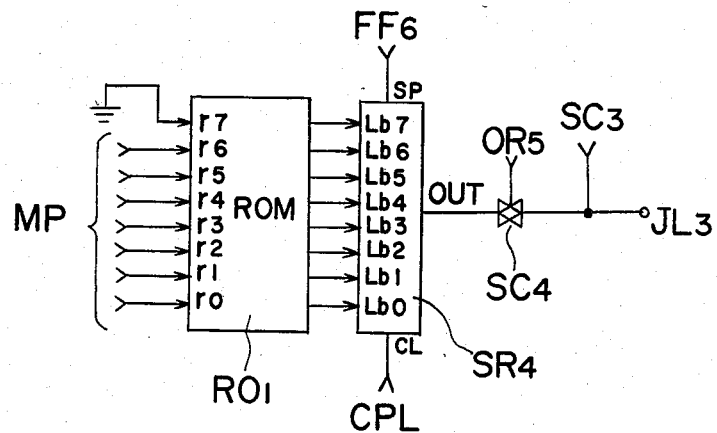
FIG. 12 is an altered form of the circuit shown in FIG. 8.

FIG. 11 shows a modification of the circuit of FIGS. 7a and 7b, and FIG. 12 shows modification of the circuit of FIG. 8 so that by the use of modified circuits, it is possible to transmit the 8-bit data given in Table 9. It is to be noted that the circuit for sending address data from the camera to the lens is the same as that shown in FIGS. 7a, 7b and 8. The addresses for specifying the ROM RO1 and transmitted sequentially in the order shown in Table. In a location specified by the address "01H", the data for check is stored. In a location specified by the address "02H", the Avo data is stored, both in the case of first and second modifications. In a location specified by the address "03H", the Avm data is stored, in the same manner as shown in Table 3. In a location specified by the address "04H", the dAvo data is stored in the case of the first modification, and the Av'o data is stored in the case of the second modification. In locations specified by the addresses "05H" to "2FH", the same data as that shown in Table 3 is stored. In order to obtain a further detailed data of focusing distance and focal length, the devices DS and FS should be so changed as to increase the number of bits in the output signal therefrom, such as from the 4-bit signal to 5-bit or 6-bit signal and, at the same time, the ROM RO1 should be so changed as to increase the address region by twice or four times where the focusing distance and focal length data are stored. Furthermore, the focusing distance and focal length data from the ROM RO1 should be increase to 8-bits long.

In FIG. 12, 8-bit data from the ROM RO1 is stored in the shift register SR4 in response to the positive edge of a pulse from the terminal TL7 and, thereafter, by the positive edges of a train of pulses from the terminals TL0 to TL7, the 8-bit data is sequentially read out bit-by-bit from the output of the shift register SR4, and is transferred through the switching circuit SC4 to the terminal JL3. The 8-bit data is further transferred from the terminal JL3 to the terminal JB3 shown in FIG. 11, and further through the switching circuit SC2 to the input of the shift register SR2. The shift register SR2 stores the 8-bit data in response to the negative edge of clock pulses CP bit-by-bit, and completes the storing by the negative edge of a clock pulse CP from the terminal TB7. Then, by the positive edge of a pulse from the terminal TB0, the 8-bit data stored in the shift register SR2 is latched in the latch circuit LA. Then, by the positive edge of a pulse from the terminal TB1, the 8-bit data is transferred from the latch circuit LA to one of the registers REG0 to REG7. According to the arrangement shown in FIGS. 11 and 12, the data transfer from the lens to the camera is 8-bits long and, therefore, one extra period is needed when compared with the above described embodiment. This means that the data transfer to the registers REG0 to REG7 delays by one period.

Figure 13:
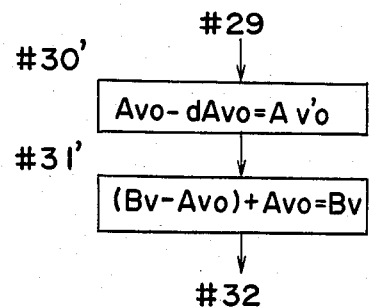
FIG. 13 is a flow chart according to a first modification of the present invention, and particulary showing the difference with respect to the flow chart shown in FIGS. 6a and 6b.

Referring to FIG. 13, there is shown a portion of a flow chart, which is different from that of FIG. 6b, for controlling the procedure of the first modification. According to the first modification, data of Avs-Av'o, Avo and dAvo are transmitted from the lens to the camera body. Therefore, when the presence of the check data is determined in the step #29, the procedure advances to the step #30' in which a calculation $$Avo - dAvo = Av'o \qquad (2')$$

is carried out for obtaining the approximate maximum aperture size data Av'o. Then, in the step #31', given data Bv-Avo and Avo are added as follows $$(Bv - Avo) + Avo = Bv \qquad (3)$$

to obtain the data Bv. Thereafter, the procedure advances to the step #32 to further carry out the same procedure as described above in connection with FIG. 6b.

Figure 14:
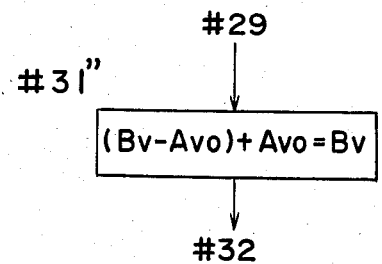
FIG. 14 is a flow chart according to a second modification of the present invention, and particularly showing the difference with respect to the flow chart shown in FIGS. 6a and 6b.

Referring to FIG. 14, there is shown a portion of a flow chart, which is different from that of FIG. 6b, for controlling the procedure of the second modification. According to the second modification, data of Avs-Av'o, Avo and Av'o are transmitted from the lens to the camera body. Therefore, when the presence of the check data is determined in step #29, the procedure advances to the step #31 in which a calculation $$(Bv - Avo) + Avo = Bv \qquad (3)$$

is carried out. Thereafter, the procedure advances to the step #32 to further carry out the same procedure as described above in connection with FIG. 6b. According to the second modification, since the data Avo and Av'o are directly read in, it is not necessary to carry out the exposure calculation with the use of the data dAvo and, therefore, the step #30 shown in FIG. 6b or the step #30' shown in FIG. 13 can be eliminated.

According to the description given above, the exposure calculation for obtaining the proper exposure information is carried out by the use of either one of a data combination of: Avs−Av'o, Av'o and dAvo; Avs−Av'o, Avo and dAvo; or Avs−Av'o, Avo and Av'o. But, according to the present invention, the combination is not limited to the above. For example, in the case where the difference data dAvo is negligible, the exposure calculation can be carried out with the use of only the data Avs−Av'o. In this case, if the camera is of a type that has only the aperture preferred mode, an exposure error (less than ½ Ev) may take place due to the neglect of the difference data dAvo, but such an error can be overridden by the wide latitude of the film itself or by changing the condition of printing. Therefore, in such a camera, it is not necessary to provide any circuits, terminals and parts when deal with the data Av'o, Avo and dAvo. All it is necessary is a device that includes a code plate from which the data Avs−Av'o is produced in association with the operation of aperture setting ring of the lens.

As has been described fully, the camera system according to the present invention has the interface circuit connected between the source of data in the camera accessory and micro-computer in the camera body for reading the accessory data temporarily in the interface circuit upon receipt of serially transmitted signal from the data source and so arranging the data ready for parallel read out to the micro-computer. Therefore, the camera system according to the present invention has following advantages.

According to the prior art data reading system, the micro-computer directly receives the serially transmitted data from the camera accessory and, therefore, the reading of one data is carried out by the data designation and data reading bit-by-bit, repeatedly, thereby requiring a relatively long period of time to read one data. Contrary, according to the present invention, the designated data is read serially by the address designation means in the interface circuit and, therefore, the bit-by-bit designation of data can be eliminated to shorten the data reading time.

Furthermore, according to the prior art system, it is necessary to provide a step for data designation and a step for data reading serially to carry out the exposure calculation in the micro-computer. Contrary, according to the present invention, the micro-computer parallelly receives only the necessary data from the interface circuit and carries out the exposure calculation and, therefore, the time necessary for the data reading and calculation can be shortened greatly. This has an advantage in lowering the likelihood of losing the shutter chance.

Moreover, when the interface circuit is reading the data, the micro-computer can be used for other purposes, such as A-D conversion of measured light amount, or data reading of manually set data, thereby shortening the sequential operation of the micro-computer. Thus, the total operating period of the micro-computer can be shortened, thereby the remaining period can be used for other purposes, resulting in more effective use of the micro-computer.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. In a camera system operable by means of a cooperation between a camera body having an opening and a camera accessory to be mounted on the camera body at the opening, the camera body comprising:
   means for generating a start signal in response to a manual operation;
   means for measuring light through the opening;
   means for setting a data of film speed;
   means for providing a data depending on the camera accessory;
   means for certifying whether or not the mounting of the camera accessory on the camera body is completed; and means responsive to said certifying means for controlling an exposure data calculation selectively in accordance with a first mode or a second mode, the exposure data being calculated in response to said measuring means, said setting means and said providing means in said first mode when the completion of the camera accessory mounting is certified, with the exposure data being calculated in response to said measuring means and said setting means in said second mode when the completion of the camera accessory mounting is not certified, wherein said controlling means is further responsive to said generating means to start its function in response to said start signal.

2. The camera body according to claim 1, wherein said providing means includes means, having first and second members, for causing a movement of said first member relative to said second member in association with a diaphragm setting member of the camera accessory, and means for producing an electric signal relating to the diaphragm aperture size in response to the position of said first member relative to said second member.

3. The camera body according to claim 2, wherein said second member includes a digital code pattern representing a series of steps for stopping-down the aperture size from the fully open aperture size by a unit of ½ Av, and said first member includes a slider slidable on said code pattern in engagement with the diaphragm setting member, and wherein said producing means includes means for outputting an electric signal representative of the steps for stopping-down the aperture size in response to the manner of electric contact between said digital code pattern and said slider.

4. The camera body according to claim 1, wherein said providing means includes means for feeding the camera accessory with an electric power, means for transmitting a digital signal to the camera accessory, and means for reading a digital data to be serially received from the camera accessory.

5. The camera body according to claim 4, wherein said controlling means includes means for initiating the function of said providing means, and wherein said feeding means is responsive to said initiating means to initiate the feeding of the electric power.

6. The camera body according to claim 1, wherein said controlling means includes means for repeating the function of said providing means and the exposure data calculation in said first mode for a period during which said starting signal continues, the repetition by said repeating means being controlled to remain for a predetermined number of times after said starting signal has discontinued.

7. The camera body according to claim 1, wherein said providing means includes means for serially transmitting address data to the camera accessory to locate necessary digital data, means for transmitting a train of clock pulses to the camera accessory and means for reading the digital data to be serially received from the camera accessory.

8. In a camera system operable by means of cooperation between a camera body having an opening and a camera accessory to be mounted on the camera body at the opening, the camera body comprising:
means for generating a start signal in response to a manual operation, said start signal continuing during the manual operation;
means for measuring light through the opening;
means for setting data representative of film speed;
means for transmitting a digital signal to the camera accessory;
means for reading digital data to be serially received from the camera accessory; and
means for controlling an exposure data calculation responsive to said measuring means, said setting means and said reading means, said controlling means including means for repeating the functions of said measuring means, said transmitting means and said reading means and the exposure data calculation for a period during which said starting signal continues, the repetition by said repeating means being controlled to remain for a predetermined number of times after said starting signal has discontinued.

9. In a camera system operable by means of cooperation between a camera body having an opening and a camera accessory to be mounted on the camera body at the opening, the camera body comprising:
means for feeding the camera accessory with electric power;
means for transmitting a digital data signal to the camera accessory;
means for reading a digital data signal serially received from the camera accessory; and
means for controlling an exposure data calculation responsive to said reading means, said controlling means including means for initiating the function of said transmitting means, wherein said feeding means is responsive to said initiating means to initiate the feeding of electric power.

10. In a camera system operable by means of cooperation between a camera body having an opening and a camera accessory to be mounted on the camera body at the opening, the camera accessory comprising:
means for accepting electric power from the camera body;
means for receiving a digital data signal from the camera body;
means for serially transmitting a digital data signal to the camera body;
means for storing various data at a plurality of addresses, the data stored at a designated one of the addresses being output at said transmitting means;
means for designating an address in response to said receiving means; and
means responsive to said accepting means for initiating the function of said designating means when the acceptance of the electric power is initiated.

11. The camera accessory according to claim 10, wherein said receiving means includes means for serially receiving an address data from the camera body and means for receiving a train of clock pulses from the camera body, and wherein said designating means includes means for converting the serially received address data into parallel address data in synchronization with said clock pulses, means for producing another address data signal depending on a manual operation, and means for selecting between the address data from said converting means and the address data from said producing means to designate the address of said storing means.

12. In a camera system operable by means of cooperation between a camera body having an opening and a camera accessory to be mounted on the camera body at the opening, the camera accessory comprising:

means for serially receiving address data from the camera body;

means for receiving a train of clock pulses from the camera body;

means for converting the serially received address data into parallel address data in synchronization with said clock pulses;

means for producing selected address data depending on a manual operation;

means for storing various data at a plurality of addresses;

means for selecting between the address data from said converting means and the address data from said producing means to designate an address of said storing means; and means for serially transmitting the data stored at the designated address to the camera body in synchronization with said clock pulses.

13. The camera accessory according to claim 12, wherein said selecting means includes means for examining the contents of the address data from said converting means, and means for determining the selection of the address data to designate the address of said storing means.

14. In a camera system operable by means of a cooperation between a camera body having an opening and a camera accessory to be mounted on the camera body at the opening, the camera body comprising:

means for measuring light through the opening;

means for setting data representative of of film speed;

a digital code pattern representing a series of steps for stopping-down the aperture size from the fully open aperture size by a multiple of ½ Av;

a slider slidable on said code pattern in engagement with a diaphragm setting member of the camera accessory;

means for outputting an electric signal representative of the steps of stopping-down the aperture size in response to the manner of electric contact between said digital code pattern and said slider; and means for controlling an exposure data calculation responsive to said measuring means, said setting means and said outputting means.

15. The camera body according to claim 14 further comprising means for receiving from the camera accessory an information relating to an approximate fully open aperture size rounded to a multiple of ½ Av and a true fully open aperture size, wherein said exposure data calculation is further responsive to said information.

16. The camera body according to claim 15, wherein said information includes a first signal representative of said approximate fully open aperture size, and a second signal representative of a difference between said approximate fully open aperture size and said true fully open aperture size.

17. The camera body according to claim 15, wherein said information includes a first signal representative of said approximate fully open aperture size, and a second signal representative of said true fully open aperture size.

18. The camera body according to claim 15, wherein said information includes a first signal representative of said true fully open aperture size, and second signal representative of a difference between said approximate fully open aperture size and said true fully open aperture size.

19. In a camera system operable by means of a cooperation between a camera body having an opening and a camera accessory to be mounted on the camera body comprising:

a diaphragm setting member engageable with a member of the camera body to transmit the steps for stopping-down the aperture size from the fully open aperture by a multiple of ½ Av; and means for transmitting to the camera body information relating to an approximate fully open aperture size rounded to a multiple of ½ Av and a true fully open aperture size.

20. The camera accessory according to claim 19, wherein said information includes a first signal representative of said approximate fully open aperture size, and a second signal representative of a difference between said approximate fully open aperture size and said true fully open aperture size.

21. The camera accessory according to claim 19, wherein said information includes a first signal representative of said approximate fully open aperture size, and a second signal representative of said true fully open aperture size.

22. The camera accessory according to claim 19, wherein said information includes a first signal representative of said true fully open aperture size, and a second signal representative of a difference between said approximate fully open aperture size and said true fully open aperture size.

23. The camera accessory according to claim 19, further comprising means for adjusting the aperture size which is ineffective for a control between said approximate fully open aperture size to said true fully open aperture size.

24. A control system for a camera, which has a demountably attachable accessory, with the accessory having at least one of a controllable factor and a factor affecting proper camera operation, the control system comprising:

a calculating circuit as part of the camera;

a data producing circuit as part of the accessory, and having a memory;

an interface circuit as part of the camera and operatively connected to the calculating circuit, with the interface circuit being operative in response to a signal from the calculating circuit to access and store data from the data producing circuit member, representative of at least one of a controllable factor and a factor affecting camera operation, and to transfer such data to the calculating circuit.

25. The apparatus of claim 24, further comprising:

the interface circuit and the data producing circuit are electrically connected by a single data transmission line over which accessing signals and accessed data signals are transmitted serially and in a time shared manner.

26. The apparatus of claim 24, further comprising:

the interface circuit includes a plurality of registers in which data received from the data producing circuit, representative of a plurality of different accessory factors, is stored and accessable to the calculating circuit in parallel form.

27. The apparatus of claim 25, further comprising:

the interface circuit includes a plurality of registers in which data received from the data producing circuit, representative of a plurality of different accessory factors, is stored and accessable to the calculating circuit in parallel form.

28. The apparatus of claim 24, further comprising:

the data producing circuit includes an accessing circuit, for accessing the memory in the data producing circuit;

the accessing circuit being connected to receive and respond to accessing signals received from the interface circuit to access fixed memory locations in the memory in the data producing circuit; and the accessing circuit being connected to receive and respond to factor indicating signals, produced within the accessory, and which factor indicating signals are indicative of the location, in the memory, among a plurality of possible locations, wherein is stored data indicative of the condition of the respective accessory factor.

29. The apparatus of claim 24, further comprising:
wherein the calculating circuit is connected to receive data from the camera, indicative of camera or accessory factors, while at the same time the interface circuit is receiving and storing data from the data producing circuit, and thereafter the calculating circuit is connected to receive data from the data producing circuit as stored in the interface circuit.

30. The apparatus of claim 28, further comprising:
wherein the calculating circuit is connected to receive data from the camera, indicative of camera or accessory factors, while at the same time the interface circuit is receiving and storing data from the data producing circuit, and thereafter the calculating circuit is connected to receive data from the data producing circuit as stored in the interface circuit.

31. The apparatus of claim 24, further comprising:
the camera has mounted thereon a digital logic coding pattern having a plurality of discrete code pattern elements;

the accessory has operatively associated therewith a brush member, having a plurality of discrete brush contacts, and being moveable in response to change in position of a component of the accessory in relation to the camera; and the digital logic coding pattern elements being electrically connected to the calculating circuit to provide to the calculating circuit a digital signal representative of which of the brush contacts are in contact with which of the coding pattern elements, and therefore, the position of the accessory component.

32. The apparatus of claim 30, further comprising:
the camera has mounted thereon a digital logic coding pattern having a plurality of discrete code pattern elements;

the accessory has operatively associated therewith a brush member, having a plurality of discrete brush contacts, and being movable in response to changes in position of a component of the accessory in relation to the camera; and the digital logic coding pattern elements being electrically connected to the calculating circuit to provide to the calculating circuit a digital signal representative of which of the brush contacts are in contact with which of the coding pattern elements, and therefore, the position of the accessory component.

33. The apparatus of claim 24, further comprising:
the accessory has mounted thereon a digital logic coding pattern having a plurality of discrete coding pattern elements;

the accessory has a moveable component which has operatively connected thereto a brush member having a plurality of discrete brush contacts, and which is moveable across the coded pattern in response to movement of the moveable component of the accessory, with the brush contacts and coded pattern being arranged to produce a coded output representative of a memory location in the accessory memory wherein is stored data indicative of the condition of the moveable component corresponding to the position indicated by the output of the coding pattern and brush contacts.

34. The apparatus of claim 32, further comprising:
the accessory has mounted thereon a digital logic coding pattern having a plurality of discrete coding pattern elements;

the accessory has a moveable component which has operatively connected thereto a brush member having a plurality of discrete brush contacts, and which is moveable across the coded pattern in response to movement of the moveable component of the accessory, with the brush contacts and coded pattern being arranged to produce a coded output representative of a memory location in the accessory memory wherein is stored data indicative of the condition of the moveable component corresponding to the position indicated by the output of the coding pattern and brush contacts.

35. The apparatus of claim 24, further comprising:
the camera and the accessory are connected by an electrical power supply contact;

reset circuitry within the accessory which is operatively connected to the power supply contact; and a starting circuit within the camera, operatively connected to the calculating circuit, for supplying power to the power supply contact in response to a signal from the calculating circuit, which signal at the same time is supplied to the interface circuit to initiate operation of the interface circuit.

36. A camera control system, comprising:
a computing means for generating camera control function signals;

a camera accessory for interchangeable mounting on the camera, wherein the identity of which camera accessory and at least one variable factor associated with which camera accessory are necessary as inputs to the computing means;

a data producing means, in the accessory, for producing accessory data, and having a memory means for storing accessory data; and an interface circuit means for accessing the memory means in the accessory and for transferring data contained in the memory means in the accessory to the computing means.

37. The apparatus of claim 36, further comprising:
the interface circuit means includes a plurality of data storage means for storing data words of multiple bits;

the computing means includes a means for selectively reading each of the plurality of data storage means in the interface circuit means and transferring the contents of each of the respective data storage means, in parallel, to the computing means.

38. The apparatus of claim 36, further comprising:
timing means within both the interface circuit means and the data producing means for controlling the serial transmission of address data from the interface circuit means to the data producing means, and the serial transmission of the data contained in the addressed memory location from the data producing means to the interface means, along a single data transmission line.

39. The apparatus of claim 37, further comprising:
timing means within both the interface circuit means and the data producing means for controlling the serial transmission of address data from the interface circuit means to the data producing means, and the serial transmission of the data contained in the addressed memory locations from the data producing means to the interface means, along a single data transmission line.

40. The apparatus of claim 36, further comprising:
code generating means within the interface circuit means for generating, seriatum, a selected number of coded signals each representative of a desired fixed memory location in the data producing means memory means;
decoding means within the data producing means for generating a signal representative of a specific memory location corresponding to each particular coded signal received from the interface circuit means; and
control means within the data producing means for detecting the completion of the receipt of the selected number of coded signals from the interface circuit means and for initiating operation of the decoding means to detect and decode at least one coded signal representative of a relative accessory component condition, and to produce an addressing signal corresponding to an address in the data producing means memory means wherein is stored data representative of the actual accessory component condition.

41. The apparatus of claim 39, further comprising:
code generating means within the interface circuit means for generating, seriatum, a selected number of coded signals each representative of a desired fixed memory location in the data producing means memory means;
decoding means within the data producing means for generating a signal representative of a specific memory location corresponding to each particular coded signal received from the interface circuit means; and
control means within the data producing means for detecting the completion of the receipt of the selected number of coded signals from the interface circuit means and for initiating operation of the decoding means to detect and decode at least one coded signal representative of a relative accessory component condition, and to produce an addressing signal corresponding to an address in the data producing means memory means wherein is stored data representative of the actual accessory component condition.

42. The apparatus of claim 36, further comprising:
starting means within the computing means for initiating power supply from the camera to the accessory and at the same time initiating operation of the interface circuit means;
reset circuit means in the data producing means, responsive to receipt of power from the power supply from the camera, for resetting the data producing means and initiating operation of the data producing means in synchronization with the interface circuit means.

43. The apparatus of claim 41, further comprising:
starting means within the computing means for initiating power supply from the camera to the accessory and at the same time initiating operation of the interface circuit means;
reset circuit means in the data producing means, responsive to receipt of power from the power supply from the camera, for resetting the data producing means and initiating operation of the data producing means in synchronization with the interface circuit means.

44. The apparatus of claim 36, further comprising:
the interface circuit means includes a plurality of data storage means for storing a plurality of data words, each made up of a plurality of bits, and each representative of a respective accessory condition, and received from the data producing means; and
accessing means in the interface circuit means for reading and transferring to the computing means, in parallel, the data words stored in each of the data storage means.

45. The apparatus of claim 43, further comprising:
the interface circuit means includes a plurality of data storage means for storing a plurality of data words, each made up of a plurality of bits, and each representative of a respective accessory condition, and received from the data producing means; and
accessing means in the interface circuit means for reading and transferring to the computing means, in parallel, the data words stored in each of the data storage means.

46. The apparatus of claim 36, further comprising:
the data producing means includes an accessing means for reading data stored in each of a plurality of fixed memory locations in the data producing means memory means, in response to accessing signals received from the interface circuit, and for thereafter accessing selected memory locations in the data producing means memory means in response to one or more accessory condition signals, generated by the accessory, and each coded to be representative of a specific respective memory location wherein is stored data representative of the actual accessory condition.

47. The apparatus of claim 45, further comprising:
the data producing means includes an accessing means for reading data stored in each of a plurality of fixed memory locations in the data producing means memory means, in response to accessing signals received from the interface circuit, and for thereafter accessing selected memory locations in the data producing means memory means in response to one or more accessory condition signals, generated by the accessory, and each coded to be representative of a specific respective memory location wherein is stored data representative of the actual accessory condition.

48. The apparatus of claim 36, further comprising:
a processing control means for controlling the input of data to the computing means so that the computing means receives other data from the camera while the interface circuit means is accessing and storing data from the data producing means, and thereafter receives the data from the interface circuit means.

49. The apparatus of claim 47, further comprising:
a processing control means for controlling the input of data to the computing means so that the computing means receives other data from the camera while the interface circuit means is accessing and storing data from the data producing means, and thereafter receives the data from the interface circuit means.

50. The apparatus of claim 36, further comprising:
a digital data producing means, mounted on the camera, for producing a digital data signal having a plurality of data bits, having:
- a coded pattern with a plurality of discrete coding pattern elements; and
- a brush means, operatively associated with the accessory and having a plurality of brush members, for movement across the coded pattern elements in response to movement of a component of the accessory in relation to a reference position.

51. The apparatus of claim 49, further comprising:
a digital data producing means, mounted on the camera, for producing a digital data signal having a plurality of data bits, having:
- a coded pattern with a plurality of discrete coding pattern elements; and
- a brush means, operatively associated with the accessory and having a plurality of brush members, for movement across the coded pattern elements in response to movement of a component of the accessory in relation to a reference position.

* * * * *